(12) United States Patent
Chan et al.

(10) Patent No.: US 9,686,142 B2
(45) Date of Patent: Jun. 20, 2017

(54) NODE-PAIR PROCESS SCOPE DEFINITION AND SCOPE SELECTION COMPUTATION

(71) Applicant: International Business Machines Corporation, Armonk, NY (US)

(72) Inventors: Allen V. C. Chan, Markham (CA); Tak S. Chau, Markham (CA); Phil S. Coulthard, Aurora (CA); Hans-Arno Jacobsen, Toronto (CA); Vinod Muthusamy, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 842 days.

(21) Appl. No.: 14/041,581

(22) Filed: Sep. 30, 2013

(65) Prior Publication Data
US 2015/0095093 A1 Apr. 2, 2015

(51) Int. Cl.
| | |
|---|---|
| *H04L 12/24* | (2006.01) |
| *H04L 12/26* | (2006.01) |
| *H04L 12/721* | (2013.01) |
| *G06F 3/0484* | (2013.01) |
| *G06Q 10/06* | (2012.01) |

(52) U.S. Cl.
CPC .......... *H04L 41/12* (2013.01); *G06F 3/04842* (2013.01); *G06Q 10/067* (2013.01); *G06Q 10/06316* (2013.01); *H04L 41/14* (2013.01); *H04L 41/22* (2013.01); *H04L 45/14* (2013.01)

(58) Field of Classification Search
USPC ........................................................ 370/254
See application file for complete search history.

(56) References Cited

U.S. PATENT DOCUMENTS

| | | | | |
|---|---|---|---|---|
| 6,069,894 A | * | 5/2000 | Holender | ........... H04Q 11/0478 370/397 |
| 6,240,463 B1 | * | 5/2001 | Benmohamed | ....... H04L 41/145 370/238 |
| 6,385,172 B1 | * | 5/2002 | Kataria | ................... H04L 45/00 370/238 |
| 6,724,722 B1 | * | 4/2004 | Wang | .................... F02D 33/003 370/229 |

(Continued)

OTHER PUBLICATIONS

Chau, Automating SLA Modeling, 2008, IBM, p. 1-16.*

(Continued)

*Primary Examiner* — Beth V Boswell
*Assistant Examiner* — Joseph Waesco
(74) *Attorney, Agent, or Firm* — Lee Law, PLLC; Christopher B. Lee

(57) ABSTRACT

A connected directed graphical representation of a process model that includes a plurality of process nodes and interconnections between the process nodes of the process model is displayed. A user selection of a subset of the process nodes of the displayed connected directed graphical representation of the process model is received. A process scope definition represented as at least one begin-end node pair is computed. The at least one begin-end node pair is usable to identify all selected nodes and interconnection path links that are reachable in a traversal from a begin node to an end node of each of the at least one begin-end node pair of the received user selection of the subset of the process nodes. The computed process scope definition is stored.

6 Claims, 17 Drawing Sheets

(56) References Cited

U.S. PATENT DOCUMENTS

| | | | |
|---|---|---|---|
| 6,795,399 B1* | 9/2004 | Benmohamed | H04L 47/10 370/235 |
| 6,909,700 B1* | 6/2005 | Benmohamed | H04L 41/145 370/231 |
| 7,065,044 B2 | 6/2006 | Wang et al. | |
| 7,962,891 B2 | 6/2011 | Kimelman et al. | |
| 8,171,492 B2 | 5/2012 | McGuire et al. | |
| 2003/0036940 A1 | 2/2003 | Leymann et al. | |
| 2003/0038836 A1* | 2/2003 | Ronald | G06F 17/30873 715/738 |
| 2003/0144868 A1* | 7/2003 | MacIntyre | G06F 17/30536 705/7.38 |
| 2003/0187707 A1 | 10/2003 | Hack et al. | |
| 2003/0212821 A1* | 11/2003 | Gillies | H04L 12/2697 709/238 |
| 2004/0196787 A1 | 10/2004 | Wang et al. | |
| 2005/0192783 A1 | 9/2005 | Lystad et al. | |
| 2005/0201285 A1* | 9/2005 | Simonis | H04L 12/2602 370/235 |
| 2005/0208949 A1* | 9/2005 | Chiueh | H04L 45/125 455/452.2 |
| 2005/0283753 A1 | 12/2005 | Ho et al. | |
| 2006/0080630 A1* | 4/2006 | Lin | G06F 17/5077 716/115 |
| 2007/0076601 A1* | 4/2007 | Wang | H04L 41/083 370/229 |
| 2008/0162205 A1 | 7/2008 | Gross | |
| 2008/0183648 A1* | 7/2008 | Goldberg | G06Q 10/04 706/13 |
| 2009/0003211 A1* | 1/2009 | Akyamac | H04J 14/0284 370/235 |
| 2009/0007127 A1* | 1/2009 | Roberts | G06F 9/526 718/104 |
| 2009/0138686 A1 | 5/2009 | Gruetzner et al. | |
| 2010/0257007 A1* | 10/2010 | Chan | G06Q 10/06 705/7.11 |
| 2012/0182865 A1* | 7/2012 | Andersen | H04L 1/22 370/228 |
| 2012/0320768 A1* | 12/2012 | Shaffer | H04W 40/16 370/252 |
| 2014/0233424 A1* | 8/2014 | Cvijetic | H04W 40/24 370/254 |

OTHER PUBLICATIONS

Muthusamy, Flexible Distributed Business Process Management, 2011, University of Toronto, p. 1-248.*

Muthusamy, SLA-Driven Business Process Management in SOA, 2009, IBM, p. 86-100.*

United States Patent and Trademark Office, Office Action for U.S. Appl. No. 14/313,512, Aug. 20, 2015, pp. 1-12, Alexandria, VA, USA.

United States Patent and Trademark Office, Notice of Allowance for U.S. Appl. No. 14/313,512, Sep. 22, 2015, pp. 1-12, Alexandria, VA, USA.

United States Patent and Trademark Office, Notice of Abandonment for U.S. Appl. No. 14/041,721, Sep. 8, 2015, pp. 1-2, Alexandria, VA, USA.

Charlton Barreto, et al., Web Services Business Process Execution Language Version 2.0, Primer/Article, May 9, 2007, pp. 1-68, OASIS Open, Published online at: http://docs.oasis-open.org/wsbpel/2.0/Primer/wsbpel-v2.0-Primer.html.

Artur Caetano, et al., A method for business process decomposition based on the separation of concerns principle, Abstract only, Proceedings of the 2010 ACM Symposium on Applied Computing, 2010, p. 1, ACM, Published online at: http://dl.acm.org/citation.cfm?id=1774107.

Jakob Pinggera, et al., Tracing the Process of Process Modeling with Modeling Phase Diagrams, Article: Business Process Management Workshops—Lecture Notes in Business Information Processing, 2012, pp. 370-382, vol. 99, Springer Berlin Heidelberg, Published online at: http://link.springer.com/chapter/10.1007%2F978-3-642-28108-2_36.

Manfred Reichert, et al., Enabling Adaptive Process-aware Information Systems with ADEPT2, Article: Handbook of Research on Business Process Modeling, 2009, pp. 173-203, IGI Global, Published online at: http://dbis.eprints.uni-ulm.de/476/1/handbook_modeling_reichert_web.pdf.

Barbara Weber, et al., Change Patterns and Change Support Features—Enhancing Flexibility in Process-Aware Information Systems, Article: Data & Knowledge Engineering, Sep. 2008, pp. 438-466, vol. 66, Issue 3, Elsevier Science Publishers B. V., Published online at: http://dbis.eprints.uni-ulm.de/335/1/DKE_WRR08.pdf.

United States Patent and Trademark Office, Office Action for U.S. Appl. No. 14/313,438, Jul. 1, 2016, pp. 1-30, Alexandria, VA, USA.

United States Patent and Trademark Office, Office Action for U.S. Appl. No. 14/313,438, Nov. 23, 2016, pp. 1-12, Alexandria, VA, USA.

* cited by examiner

300

400

500

600

800

NODE-PAIR PROCESS SCOPE DEFINITION AND SCOPE SELECTION COMPUTATION

RELATED APPLICATIONS

This application is related to concurrently filed U.S. patent application Ser. No. 14/041,721 titled "NODE-PAIR PROCESS SCOPE DEFINITION ADAPTATION," which was filed in the United States Patent and Trademark Office on Sep. 30, 2013, and which is incorporated herein by reference in its entirety.

BACKGROUND

The present invention relates to business process scoping. More particularly, the present invention relates to node-pair process scope definition and scope selection computation, and node-pair process scope definition adaptation.

Visual business process modeling tools allow representations of business processes to be entered and viewed in a graphical format. The graph of a business process may be represented, for example, by nodes and links between nodes that represent the flow of the business process.

BRIEF SUMMARY

A method includes: displaying, via a processor, a connected directed graphical representation of a process model that comprises a plurality of process nodes and interconnections between the process nodes of the process model; receiving a user selection of a subset of the process nodes of the displayed connected directed graphical representation of the process model; computing a process scope definition represented as at least one begin-end node pair, where the at least one begin-end node pair is usable to identify all selected nodes and interconnection path links that are reachable in a traversal from a begin node to an end node of each of the at least one begin-end node pair of the received user selection of the subset of the process nodes; and storing the computed process scope definition.

A system includes a memory; and a processor programmed to: display a connected directed graphical representation of a process model that comprises a plurality of process nodes and interconnections between the process nodes of the process model; receive a user selection of a subset of the process nodes of the displayed connected directed graphical representation of the process model; compute a process scope definition represented as at least one begin-end node pair, where the at least one begin-end node pair is usable to identify all selected nodes and interconnection path links that are reachable in a traversal from a begin node to an end node of each of the at least one begin-end node pair of the received user selection of the subset of the process nodes; and store the computed process scope definition within the memory.

A computer program product includes a computer readable storage medium having computer readable program code embodied therewith, where the computer readable program code when executed on a computer causes the computer to: display a connected directed graphical representation of a process model that comprises a plurality of process nodes and interconnections between the process nodes of the process model; receive a user selection of a subset of the process nodes of the displayed connected directed graphical representation of the process model; compute a process scope definition represented as at least one begin-end node pair, where the at least one begin-end node pair is usable to identify all selected nodes and interconnection path links that are reachable in a traversal from a begin node to an end node of each of the at least one begin-end node pair of the received user selection of the subset of the process nodes; and store the computed process scope definition.

DETAILED DESCRIPTION

Figure 1:
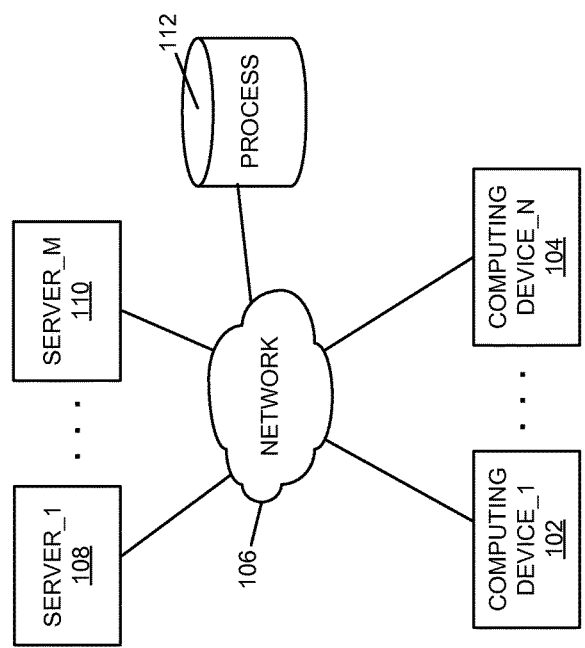
FIG. 1 is a block diagram of an example of an implementation of a system for node-pair process scope definition and scope selection computation, and node-pair process scope definition adaptation, according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides node-pair process scope definition and scope selection computation, and node-pair process scope definition adaptation (collectively alternatively referred to herein as "adaptive scoping of business processes"). Scope definitions of process subsets within business processes may be compactly defined using a set of start and end node pairs, and compactly stored for reuse. One or more pairs of start and end nodes may be used to exclusively define a scope. As such, the scope definition itself excludes all of the nodes and links that are reachable in a traversal from a begin node to an end node of every pair of start and end nodes, but the scope is considered to be made up of all of the nodes and links that are reachable in a traversal from the begin node to the end node of every pair of start and end nodes. Because scopes are defined using start/end node pairs, the process subsets may define both contiguous regions and may define non-contiguous regions within the underlying business process. As the underlying business processes change over time (e.g., by changes to the interior nodes of a scope other than the start or end nodes, deletion of interior nodes, addition of interior nodes, or redefinition of the interactions/linkages among interior nodes), the encompassed/enclosed scope dynamically "adapts" to these changes based upon currently existing nodes and linkages between the defined start and end nodes within the scope definition. Process modeling and analysis activities may be performed on demand using the defined scope that has been dynamically adapted to the changes of the underlying business model without requiring an update of the compact scope definition (unless a start or end node of a start/end node pair have been deleted). As such, definitional synchronization of the scope definitions with process modifications may be performed programmatically and on demand. Accordingly, the present technology facilitates highly-adaptive business process scope modeling and analysis, and facilitates compact storage of defined scopes that may be reused across multiple business process changes.

The technology described herein allows modifications to a sub-process enclosed by a scope to become or remain part of the scope. If nodes are added, removed, or modified within a scope, any property encapsulated by the scope may be applied to the new nodes in a programmatic automated manner. For example, regarding a payment transaction process, activities in the process that carry out a payment may be denoted by a scope to execute in a transactional context. A change to the payment logic, such as a changed requirement for additional logging of the payment, may also execute within a transaction without requiring modification of the defined scope. As such, the original scope definition is elastic to accommodate the new activity without additional action from the user/developer. In particular, a change such as adding, deleting, or modifying a task may trigger processing to determine if the new or modified task belongs within the scope, and that the deleted task is no longer part of the scope. In this manner, the scope definition is adaptive to changes in the underlying business process without intervention from the user/developer.

The choice of representing scopes using sets of one or more start/end node pairs also allows the scope to be elastic to modifications, changes, and adaptations to the process. For example, any of the following modifications may be automatically classified to belong to an enclosed defined scope: changing the interior nodes of a scope (other than the start or end nodes), deleting nodes, adding nodes, or redefining the interactions among nodes. Other modifications and changes to business processes are possible and all are considered within the scope of the present subject matter.

The present technology leverages four primary procedures that may be selectively applied depending on the structure of the particular business sub-process of interest. The first procedure may be used to define a scope regardless of whether the underlying sub-process that represents the portion of the workflow is an acyclic or a cyclic graph. A second procedure may be used to compute a selection of nodes within a process based upon a defined scope (and as such may be considered a corollary of the first procedure).

The third and fourth procedures are utilized to adapt a scope definition to changes in the underlying process over time. A selection of one of the third and fourth procedures is based upon the particular tooling environment and the degree of integration between a given process editor tool chain and the resulting selection of the respective scope adaptation procedure. Where the process editor tool chain is a componentized tool chain, a passive adaptation of a scope definition may be performed. Where the process editor tool chain is a fully integrated environment, active adaptation of a scope definition may be performed.

Regarding scope definition, the technology described herein analyzes the selected nodes and interconnections to determine whether the selected nodes that form the sub-process are acyclic or cyclic in nature. The first procedure is utilized to compute a scope definition based on the nodes in the acyclic or cyclic process. Again, as a corollary to the scope definition procedure, a selection computation procedure provides a selection of nodes that are encompassed by a defined scope.

Orthogonal to the above two cases are the third and fourth procedures that adjust a scope representation as a result of changes to a process to dynamically adapt the defined scope to the changes. A "passive" scope adaptation procedure is applicable to a componentized tool chain and may be used to adapt a scope for changes to a process other than start/end node pairs. An "active" scope adaptation procedure is applicable to a fully integrated environment and may be used to manage changes to the process, including changes to start/end node pairs.

The passive scope adaptation procedure takes as input a defined scope as one or more start/end node pair(s) and the modified process graph. The passive scope adaptation procedure computes the new scope by adapting the scope to reflect the changes to the process using the provided inputs. The types of changes the passive procedure may accommodate may be constrained because a componentized tool chain may not preserve knowledge of the original process or incremental modifications made to the process. For example, if one of the start or end nodes that define a scope are deleted from a process, the output of the passive procedure may be a redefinition of the scope definition by the user.

Regarding classifications/classes of modifications that the passive procedure may manage, the passive procedure may adapt scope definitions for changes, such as for example, nodes added within an existing scope, nodes deleted within an existing scope, and nodes updated within an existing scope. Additional modifications that the passive procedure may manage include changes to the flow(s) within an existing scope, nodes added, nodes deleted, or nodes updated outside a scope. Further, changes, such as an addition of a task to a process, may be evaluated programmatically to determine whether the task belongs within the scope defined by the respective start/end node pairs. It should be noted that for purposes of the examples and description herein, nodes "within" an existing scope do not include the start and end nodes that define the scope, and may be considered "internal" nodes, while the start and end nodes may be considered "boundary" nodes.

In contrast to the passive scope adaptation procedure, the "active" scope adaptation procedure takes as input a defined scope as one or more start/end node pair(s), the original process graph associated with the defined process scope, and the actual sequence of modifications applied to a process. The actual sequence of modifications is tracked by the tool chain within the integrated environment as the process is modified (e.g., node additions, deletions, changes and the sequence of such changes) and the sequence of modifications is provided as input to the active scope adaptation procedure. The active scope adaptation procedure computes the new scope by adapting the scope to reflect the changes to the process using the provided inputs. However, as described above, the active procedure may accommodate more types of process modifications because of the additional information provided by the integrated environment. For example, immediately after a start node of a scope representation is deleted from a process, the active procedure may shrink the scope to begin from the successors of the deleted node. The scope shrinkage may be accomplished by redefining one or more new start nodes for any defined start/end node pairs within the scope definition.

Regarding classifications/classes of modifications that the active procedure may manage, the active procedure may manage changes described above that may be managed by the passive procedure. The active procedure may additionally manage changes, such as for example, deletion of nodes at the boundary of a scope, (e.g., the start or end nodes of node pairs that define a scope), and updating of nodes at the boundary of a scope.

As such, the present technology improves business process development and maintenance by providing a mechanism that is elastic to many classes of process modifications. Further, the present technology is flexible in that it may represent arbitrarily complex selections of a process, including non-contiguous portions of a process. The scope definition is represented in a compact form for storage, retrieval, and processing. Additionally, the scope representation is intuitive as it reflects the user's mental model of a selection of a sub-process (e.g., a range of nodes and interconnections). Furthermore, the procedures provide a record of the user's intuition of how a process has been modified and provide an elastic scoping mechanism that may reduce user effort, that may save development cost and error-prone manual refactoring and verification, and that may reduce time to market. The present technology may be applied to and support business processes with workflows that are represented by both acyclic graphs and cyclic graphs.

It should be noted that conception of the present subject matter resulted from recognition of certain limitations associated with business process scoping. For example, it was observed that a business process user/analyst/developer may wish to select a subset of a business process (including the nodes and links of the underlying graph) to which to apply certain commands. Examples of such commands may include, among others, requiring a service level agreement (SLA) to be satisfied for a selected sub-process, requiring activities within a sub-process represented by a selected subset of nodes in an underlying graph to be instrumented for monitoring, indicating replication requirements for sub-processes, expressing deployment constraints for sub-processes, specifying activities to execute within a transactional context for sub-processes, marking activities associated with sub-processes to be reviewed by a developer, and designating that interactions between the activities of sub-processes satisfy messaging constraints (e.g., delivery guarantees, latency guarantees or strict ordering properties). It was further observed that process subsets may not be contiguous within the process, such that for example, the activities that concern particular partner/entity interactions, or those owned by a particular department group, may apply to dis-contiguous activities located anywhere within an underlying process. It was further observed that certain tools apply rigid definition of scopes, such as by numeric enumeration of all tasks within a selection that belong to a scope.

However, it was determined that, based upon these observations, this conventional approach is inelastic and invariant to process changes because newly added tasks are not part of the scope selection and do not inherit the properties of the existing defined scope, that removed nodes remain defined within the scope, and that modified or updated nodes or links are not properly represented within existing defined scopes. Further, it was determined based upon these observations that management of scopes over time is tedious, error-prone, and infeasible for large development efforts. It was further determined that conventional tools do not support automated classification of process modifications. The present subject matter improves business process development and maintenance by providing for adaptive scoping of business processes, as described above and in more detail below. As such, improved business process development and maintenance may be obtained through use of the adaptive scoping of business processes technology described herein.

The adaptive scoping of business processes described herein may be performed in real time to allow prompt and compact scope definition of a portion of a business process, with scope adjustment performed on demand (adaptively) based upon changes to the business process itself without requiring redefinition of the business process scope definition of the portion of a business process. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for node-pair process scope definition and scope selection computation, and node-pair process scope definition adaptation. A computing device_1 102 through a computing device_N 104 communicate via a network 106 with several other devices. The other devices include a server_1 108 through a server_M 110. A process database 112 stores business processes as defined and utilized by users of the respective devices within FIG. 1.

As will be described in more detail below in association with FIG. 2 through FIG. 18B, the computing device_1 102 through the computing device_N 104 and the server_1 108 through the server_M 110 may each provide automated adaptive scoping of business processes. The automated adaptive scoping of business processes is based upon definition of business process scopes, and analytical adaptation of defined scopes throughout business process life cycles. The automated adaptive scoping of business processes facilitates on demand support for business processes with workflows that are represented by both acyclic graphs and cyclic graphs, and with scopes that are defined as both contiguous and non-contiguous sub-processes within the business processes. As such, a variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, etc.), a web server, application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
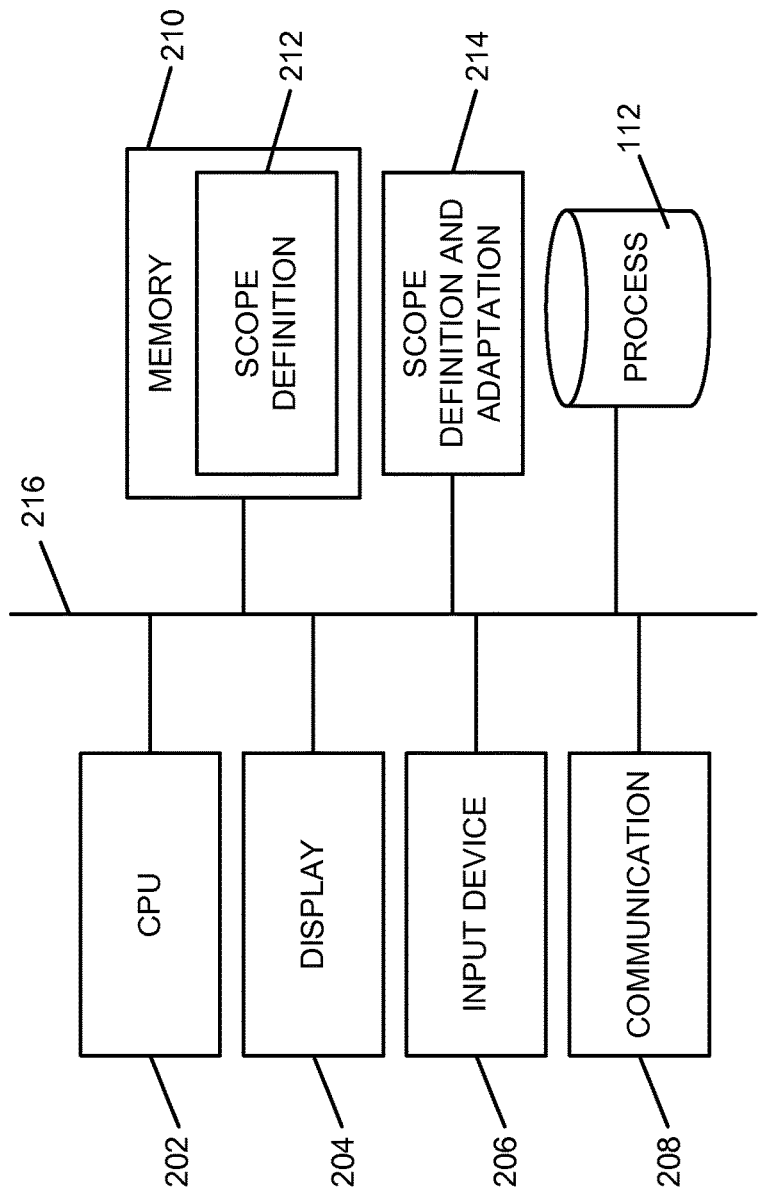
FIG. 2 is a block diagram of an example of an implementation of a core processing module capable of performing node-pair process scope definition and scope selection computation, and node-pair process scope definition adaptation, according to an embodiment of the present subject matter.

FIG. 2 is a block diagram of an example of an implementation of a core processing module 200 capable of performing node-pair process scope definition and scope selection computation, and node-pair process scope definition adaptation. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing for adaptive scoping of business processes in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices, such as for the server_1 108 through the server_M 110 where such devices are network accessible. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a scope definition storage area 212 that stores scope definitions, as described above and in more detail below, within the core processing module 200. As will be described in more detail below, the scope definitions stored within the scope definition storage area 212 represent compact scope definitions. The scope definitions may be adapted on demand based on changes associated with the underlying business process, in many cases without changes to the compact scope definition (e.g., unless a boundary node is deleted).

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A scope definition and adaptation module 214 is also illustrated. The scope definition and adaptation module 214 provides on-demand scope definition and adaptation for the core processing module 200, as described above and in more detail below. The scope definition and adaptation module 214 implements the automated adaptive scoping of business processes of the core processing module 200.

It should also be noted that the scope definition and adaptation module 214 may form a portion of other circuitry described without departure from the scope of the present subject matter. Further, the scope definition and adaptation module 214 may alternatively be implemented as an application stored within the memory 210. In such an implementation, the scope definition and adaptation module 214 may include instructions executed by the CPU 202 for performing the functionality described herein. The CPU 202 may execute these instructions to provide the processing capabilities described above and in more detail below for the core processing module 200. The scope definition and adaptation module 214 may form a portion of an interrupt service routine (ISR), a portion of an operating system, a portion of a browser application, or a portion of a separate application without departure from the scope of the present subject matter.

The process database 112 is also shown associated with the core processing module 200 within FIG. 2 to show that the process database 112 may be coupled to the core processing module 200 without requiring external connectivity, such as via the network 106.

The CPU 202, the display 204, the input device 206, the communication module 208, the memory 210, the scope definition and adaptation module 214, and the process database 112 are interconnected via an interconnection 216. The interconnection 216 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the process database 112 is illustrated as a separate component for purposes of example, the information stored within the process database 112 may also/alternatively be stored within the memory 210 without departure from the scope of the present subject matter. Accordingly, the core processing module 200 may take many forms and may be associated with many platforms.

Procedure Overviews

FIG. 3 through FIG. 6 below are input and output processing diagrams associated with the different procedures described herein. It should be noted that the respective procedures may be implemented and executed by the scope definition and adaptation module 214. The representations within FIG. 3 through FIG. 6 are for the purposes of illustrating and describing higher-level inputs and outputs for the respective procedures.

Figure 3:
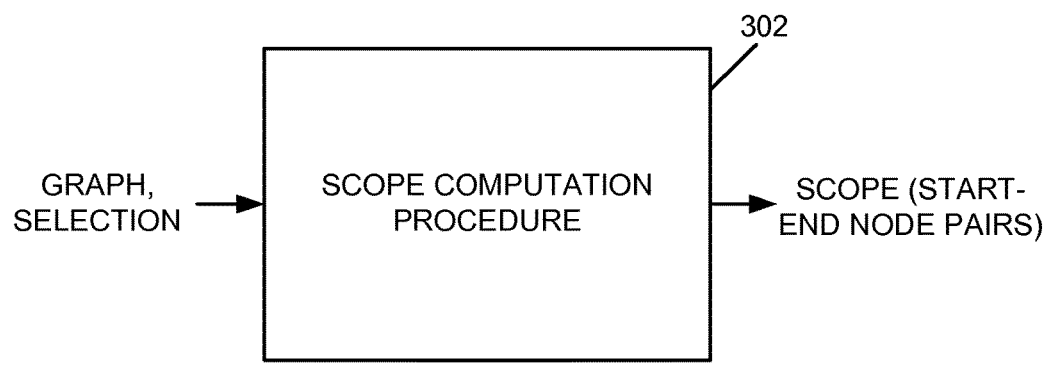
FIG. 3 is a diagram of an example of an implementation of input and output processing of a scope computation procedure that may be implemented as part of node-pair process scope definition according to an embodiment of the present subject matter.

FIG. 3 is a diagram of an example of an implementation of input and output 300 processing of a scope computation procedure 302 that may be implemented as part of node-pair process scope definition. As can be seen from FIG. 3, the scope computation procedure 302 operates using a graph and a selection of nodes in the graph as input (left side). The scope computation procedure 302 computes a scope (e.g., start-end node pairs) that represents the input selection of nodes in the graph. The computed scope is output for further processing (right side). The scope computation procedure 302 works on both cyclic and acyclic graphs to define selected scopes as described above and in more detail below.

Figure 4:
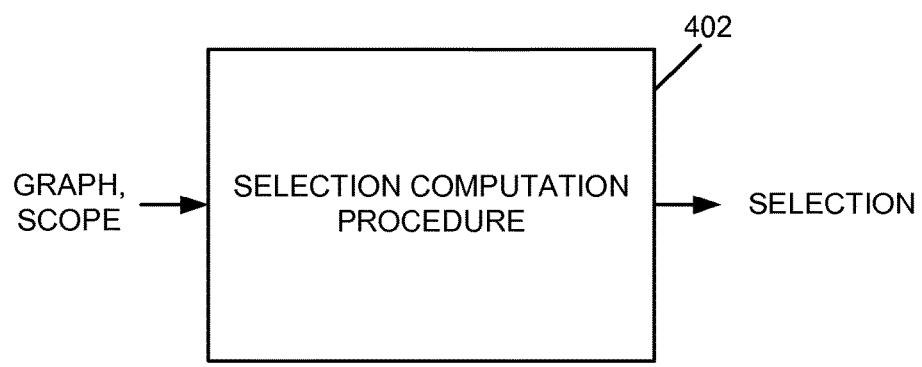
FIG. 4 is a diagram of an example of an implementation of input and output processing of a selection computation procedure that may be implemented as part of scope selection computation according to an embodiment of the present subject matter.

FIG. 4 is a diagram of an example of an implementation of input and output 400 processing of a selection computation procedure 402 that may be implemented as part of scope selection computation. As can be seen from FIG. 4, the selection computation procedure 402 operates using a graph and a scope as input (left side). The selection computation procedure 402 computes the set of nodes represented by the scope. As such, the selection computation procedure 402 procedure is a logical dual of the scope computation procedure 302, described above. The selection computation procedure 402 outputs a selection of a set of nodes represented by the scope.

Figure 5:
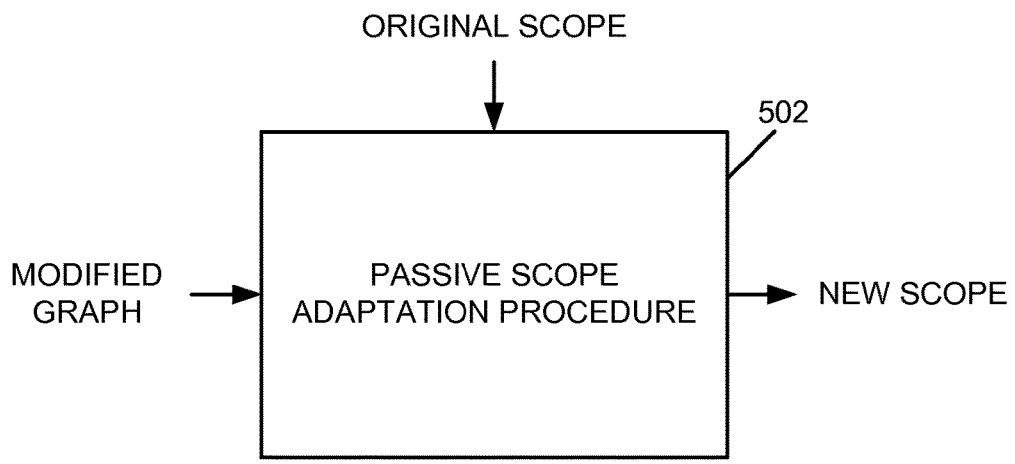
FIG. 5 is a diagram of an example of an implementation of input and output processing of a passive scope adaptation procedure usable in passive situations applicable to a componentized tool chain that may be implemented as part of node-pair process scope definition adaptation according to an embodiment of the present subject matter.

FIG. 5 is a diagram of an example of an implementation of input and output 500 processing of a passive scope adaptation procedure 502 usable in passive situations applicable to a componentized tool chain that may be implemented as part of node-pair process scope definition adaptation. As can be seen from FIG. 5, the passive scope adaptation procedure 502 operates using an original/previous scope (top input, represented as start-end node pairs) and the new modified graph (left side) as input. The passive scope adaptation procedure 502 computes and outputs the new scope representation (right side).

Figure 6:
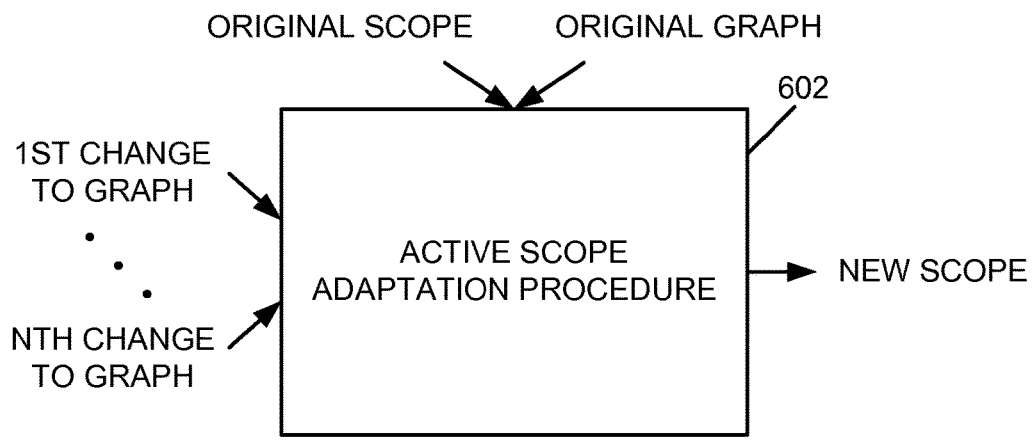
FIG. 6 is a diagram of an example of an implementation of input and output processing of an active scope adaptation procedure usable in active situations applicable to a fully integrated environment that may be implemented as part of node-pair process scope definition adaptation according to an embodiment of the present subject matter.

FIG. 6 is a diagram of an example of an implementation of input and output 600 processing of an active scope adaptation procedure 602 usable in active situations applicable to a fully integrated environment that may be implemented as part of node-pair process scope definition adaptation. As can be seen from FIG. 6, the active scope adaptation procedure 602 operates using an original/previous scope (top left input, represented as a previous set of start-end node pairs), an original/previous graph (top right input), and a sequence of modifications to the original graph (left side, first change . . . to Nth change) as input. The active scope adaptation procedure 602 computes and outputs the new scope representation (right side).

Definition of a Valid Path

As a foundation to the description below, it should be noted that a "valid path" is defined to exist between any two nodes if there exists an interconnected sequence of nodes between the two nodes. Definition (1) below illustrates a mathematical definition of a valid path between two nodes, "p" and "q."

Definition (1):

A valid path from node "p" to node "q" may be defined as:
a sequence of nodes $n_1, \ldots, n_k$
where
$n_1 = p$, and
$n_k = q$, and
$n_i \notin \{p, q\}$ for all $1 < i < k$
there is an edge from $n_j$ to $n_{j+1}$ for all $1 <= j < k$ As can be seen from Definition (1), a valid path includes all nodes within the sequence of interconnected nodes that are not elements of the set of the nodes "p" and "q" themselves. The term "edge" represents an interconnection between nodes.

Figure 7:
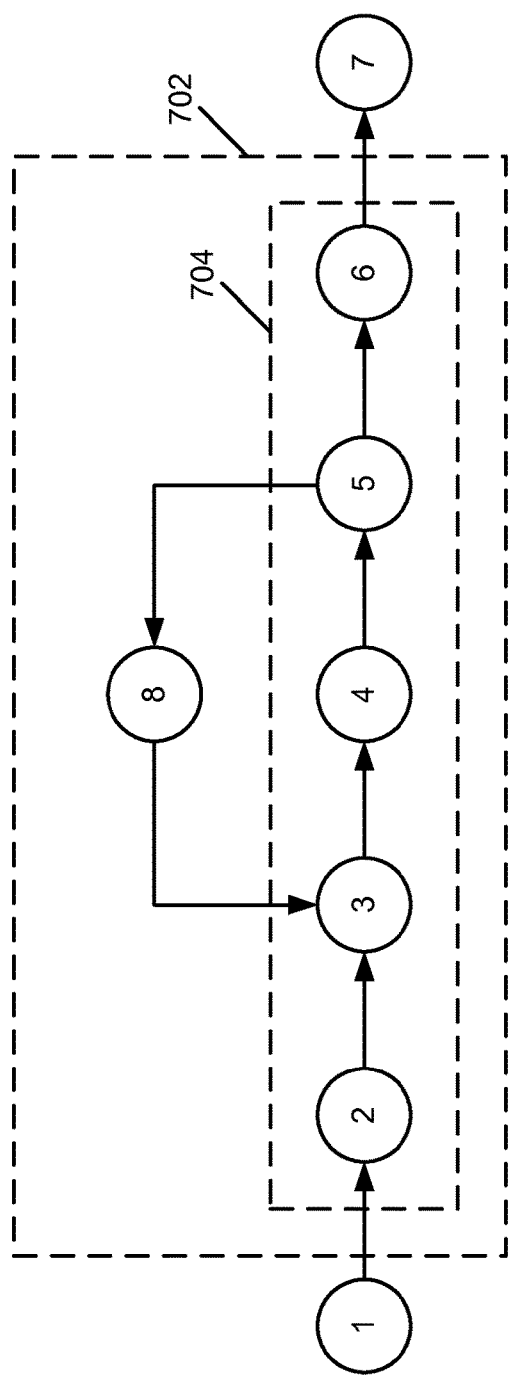
FIG. 7 is a graphical representation of an example of an implementation of a cyclic business model used herein to further refine the definition of a "valid path" for purposes of node-pair process scope definition and scope selection computation, and node-pair process scope definition adaptation, according to an embodiment of the present subject matter.

FIG. 7 is a graphical representation of an example of an implementation of a cyclic business model 700 that is described below and used herein to further refine the definition of a "valid path" for purposes of node-pair process scope definition and scope selection computation, and node-pair process scope definition adaptation. As can be seen from FIG. 7, eight (8) nodes are illustrated. Reference designators separate from the node identifiers (IDs) are omitted because the node identifiers themselves adequately reference the respective nodes for purposes of description. It should further be noted that the cyclic business model 700 is considered "cyclic" because a path exists from node five (5) to node eight (8), and a path exists from node eight (8) back to node three (3), which creates a cycle in the business model 700. Using the example the cyclic business model 700, a few example paths will be described and noted to be either valid or not valid paths, based upon the Definition (1) above.

As such, valid paths from node two (2) to node six (6) include two nodes sequences. A first valid path node sequence is acyclic and includes nodes within the set (2, 3, 4, 5, 6). The second valid path node sequence is cyclic and includes nodes within the set (2, 3, 4, 5, 8, 3, 4, 5, 6).

There is only one valid path from node three (3) to node six (6). As defined above, for a valid path, the start and end nodes are not elements of the set of the nodes in the sequence. As such, a valid acyclic path from node three (3) to node six (6) includes nodes within the set (3, 4, 5, 6). A cyclic path from node three (3) that includes nodes within the set (3, 4, 5, 8, 3, 4, 5, 6) is not a valid path because the start node three (3) recurs as an element within the set of nodes in the sequence for the cyclic path.

Similar analysis may be applied to define a single acyclic valid path between node two (2) and node (5) as nodes within the set (2, 3, 4, 5). It should be noted in this example that a cyclic path that includes nodes within the set (2, 3, 4, 5, 8, 3, 4, 5) is not considered a valid path for purposes of the present description because the end node five (5) recurs as an element within the set of nodes in the sequence for the cyclic path.

With the previous definitions and examples of valid paths, the respective procedures and their descriptions will be provided below. It should be noted that the procedures themselves are presented using mathematical notation followed by text description of the respective computational processing to assist with review of the description of the respective procedures. However, it is understood that the mathematical representation of the respective procedures forms the mathematical definition of the respective procedures, and is considered superior to the text description.

Scope Computation Procedure

Regarding the scope computation procedure, as described above, the scope computation procedure may be utilized to compute a scope from a selection of nodes within a graph. The graph and the selection of nodes are provided as input. The following Procedure (1) represents the scope computation procedure. It should be noted that the scope computation procedure represented by the Procedure (1) may be applied to both cyclic and acyclic graphs.

Procedure (1):
Given:
G—a connected, directed graph representing the process workflow
S—a set of nodes included in the selection
Compute the resulting scope:
P={(b, e)}—a set of (begin, end) node pairs subject to the below constraints
Notation:
Let $G_S$ be the subgraph of G induced by S.
Let N(p, q) represent the nodes visited in all paths from p to q in G
Note if p==q, then N(p, q)={p}
Constraints:
Constraint (1): For every (b, e) in P, there is a valid path from b to e in $G_S$.
Constraint (2): For every (b, e) in P, N(b,e) is a subset of S.
Constraint (3): For every n in S, there exists a (b, e) in P such that n is in N(b, e).
Constraint (4): For every (b, e) in P, there does not exist a (b', e') where:
b' is in S, and
e' is in S, and N(b, e) is a proper subset of N(b', e'), and
N(b', e') is a subset of S
Procedure Steps:
Step (1): Given the selection S, compute the induced subgraph $G_S$
Step (2): Set of candidate pairs: C={(p, q)|both p and q are in S}
Step (3): for each (p, q) in C
Step (3.1): if there is no path from p to q in $G_S$ (see constraint 1)
Step (3.1.1): then remove (p, q) from C
Step (3.2): if N(p, q) is a proper superset of S (see constraint 2)
Step (3.2.1): then remove (p, q) from C
Step (4): for each (p, q) in C
Step (4.1): if there is a (p', q') in C where N(p', q') is a proper superset of N(p, q) (See constraint 4)
Step (4.1.1): then remove (p, q) from C With reference to the scope computation procedure (Procedure (1) above), Step (1) of the Procedure (1) computes a subset/subgraph "$G_S$" of the input graph "G" that includes the selected nodes "S." This is used in the subsequent Step (3.1) of the procedure.

Step (2) of the Procedure (1) initializes the set of candidate node-pairs to be all combinations of nodes in the selection "S." It should be noted that the number of node-pairs is the square of the number of nodes in the selection (e.g., including self-pairings of nodes). Further, by including all possible node-pairs, the candidate set at this point satisfies constraint (3). Additionally, for each node "n" in "S," the path corresponding to the node-pair "(n, n)" in the candidate set will include the node "n."

Steps (3) and (4) of the Procedure (1) then remove elements from the candidate set that violate the procedure's constraints. Step (3.1) removes elements that violate scope definition constraint (1) (e.g., that there is a path from the begin node to the end node in the subgraph). Step (3.2) removes elements that violate scope definition constraint (2) (e.g., that all the nodes in the path from the begin to the end node are in the selection). Step (4) of the Procedure (1) removes elements that violate scope definition constraint (4) (e.g., that there are no "redundant" node-pairs). As such, the Steps (3) and (4) of the Procedure (1) remove non-scope definitional candidate node pairs from the set of candidate node pairs, where the non-scope definitional candidate node pairs violate the respective scope definition constraints.

It should be noted that a dashed-line representation 702 within FIG. 7 represents a selection "S1" and a dashed-line representation 704 represents a selection "S2" that will both be described further below in association with a description of example applications of the scope computation procedure to a cyclic graph for purposes of node-pair process scope definition in association with adaptive scoping of business processes. As a preliminary matter, it should be noted that the selection "S1" includes/encompasses a cyclic portion of the graph that represents the cyclic business model 700, while the selection "S2" does not include/encompass a cyclic portion of the graph that represents the cyclic business model 700. This description of cyclic graph computational processing will be deferred in favor of a description of an example of application of the scope computation procedure to an acyclic graph to reduce complexity of the initial examples described herein.

Figure 8:
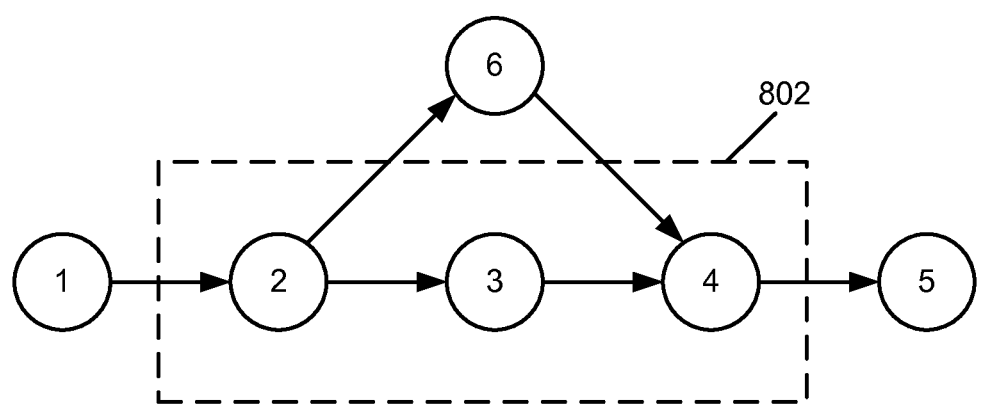
FIG. 8 is a graphical representation of an example of an implementation of a business model to illustrate application of the scope computation procedure to an acyclic graph for purposes of node-pair process scope definition according to an embodiment of the present subject matter.

An example will now be provided to illustrate application of the scope computation procedure to an acyclic graph for purposes of node-pair process scope definition in association with adaptive scoping of business processes. FIG. 8 is a graphical representation of an example of an implementation of a business model 800 that is described below to illustrate application of the scope computation procedure to an acyclic graph for purposes of node-pair process scope definition. For purposes of computational processing, "G" represents the complete graph 800, while a dashed-line representation 802 represents a selection "S" detected/received from a user via a user interface (UI) configured as an interface for implementation of adaptive scoping of business processes.

As a first Step (1) of computational processing, the subgraph "$G_S$" represented by the selection "S" is computed. As can be seen from FIG. 8, the subgraph "$G_S$" includes the node two (2), node three (3), and node four (4).

The second Step (2) of the computational processing includes computation of a set of candidate pairs "C" of nodes, as follows:

C={(2, 2), (2, 3), (2, 4), (3, 2), (3, 3), (3, 4), (4, 2), (4, 3), (4, 4)}

The candidate pairs list "C" of nodes includes node pair of all combinations of nodes in the selection "S," meaning node pairs as described above that may be represented as "(p,q)" where both "p" and "q" are elements of the set/pair of nodes.

The next Step (3.1) of the computational processing removes candidates for which there is no path in "$G_S$" based upon the set of candidate pairs "C." For example, node pairs (3, 2), (4, 2), and (4, 3) have no path in "$G_S$." Based upon this step of computational processing, the remaining elements in "C" are:

C={(2, 2), (2, 3), (2, 4), (3, 3), (3, 4), (4, 4)}

The next Step (3.2) of the computational processing removes candidate pairs that remain in the candidate pairs list "C" that visit (e.g., that connect to) nodes that are not in the selection "S." The nodes "N(p, q)" visited by a candidate pair "(p, q)" includes all nodes in all paths from "p" to "q" in "G." It should be noted that if the nodes are the same node (e.g., if p=q), then the candidate pairs that visit the nodes that are not in the selection equals the node itself (e.g., then N (p, q)={p}). Additionally, if the remaining candidate pairs that visit the nodes that are not in the selection is a superset of the selection (e.g., if N(p, q) ⊃ s), then the candidate pair is also removed from the candidate pairs list (e.g., then remove (p, q) from C).

Within the present example, this portion of computational processing results in the following operations. Node pair "(2, 4)" is removed from the candidate pairs list "C" because the nodes visited by the node pair "(2, 4)" are not in the selection (e.g., N (2, 4)={2, 3, 4, 6} ⊃ S). The node pair "(2,2)" is not removed because the nodes visited by the node pair "(2, 2)" is not a superset of the selection (e.g., N (2, 2)={2} !⊃ S). Similarly, the node pair "(2, 3)" is not removed because the nodes visited by the node pair "(2, 3)" is not a superset of the selection (e.g., N (2, 3)={2, 3} !⊃ S). As such, the node pairs that remain after this stage of computational processing are:

C={(2, 2), (2, 3), (3, 3), (3, 4), (4, 4)}

The next Step (4) of the computational processing removes redundant candidates from the candidate pairs list "C." If the nodes visited by the node pair "(p, q)" in the candidate pairs list "C" is a superset of those visited by the pair "(p', q')" in "C," then the candidate pair "(p', q')" is redundant. Within the present example, the node pair "(2, 2)" is considered redundant and is removed because the nodes "N(2, 3)" visited (e.g., the nodes 2 and 3) represent a superset of the nodes "N(2, 2)" visited (e.g., the node 2). As such, node pairs "(3, 3)" and "(4, 4)" are also removed from the candidate pairs list "C" based upon the same computational processing. It should be noted that the computational processing does not remove the node pairs "(2, 3)" or "(3, 4)" because these node pairs are not redundant with any remaining candidates. Specifically, the nodes "N (2, 3)" visited (e.g., the nodes 2 and 3) are not a superset of the nodes "N(3, 4)" visited (e.g., the nodes 3 and 4) (collectively, N (2, 3) !⊃ N(3, 4)). Accordingly, the resultant/remaining candidate pairs list "C" is as follows:

C={(2, 3), (3, 4)}

It should be noted that the resultant/remaining candidate pairs list "C" are the calculated and computed "scope" or "scope definition," as described above. Further, it should be noted that the nodes in the calculated scope are equal to the nodes in the selection "S" because of the overlapping/intervening node (3), though for more complex examples the scope may be defined using node pairs that do not have overlapping/intervening nodes.

To assist with understanding of certain subtleties of the computational processing described above and the contributions of the individual computational steps to the final result, description further details the individual step contributions. Regarding the Step (1), the calculation of the "$G_S$" is performed in Step (1) to provide input for Step (3.1).

Additionally, regarding the Step (2), a non-computational approach may lead to inclusion of nodes in the "periphery" of a selection in the candidate pairs list "C." This may occur in such an approach because all other interior nodes may be on a path visited by such periphery nodes. For example, such an approach may cause the candidate pairs list "C" to only include the node pairs "(2, 4)" and "(4, 2)" (e.g., C={(2, 4), (4, 2)}). However, the computational processing would remove the node pair "(4,2)" in the Step (3.1), and removes the node pair "(2, 4)" in the Step (3.2). As such, the candidate pairs list "C" would be the empty set (e.g., C={ }), where as described above, the actual candidate pairs list "C" that results from the computational processing is calculated to be "C={(2, 3), (3, 4)}." Accordingly, the Step (2) prevents inadvertent node pair result sets. Additionally, Step (2) prevents self-pairs from being excluded, such as in a situation where a selection includes a single node (e.g., in single node selections and in certain situations where there are cycles in a graph).

Regarding Step (3.1), as described above, this computational processing step removes pairs in candidate pairs list "C" that will never occur in the ultimate resultant computation of the scope. Removing these elements early reduces the size of the intermediate candidate pairs list "C" and reduces the subsequent computational processing. As such, the Step (3.1) may improve processing efficiency.

Regarding Step (3.2), without this computational processing step, the node pair "(2, 4)" would remain in the candidate pairs list "C." As a consequence, in Step (4) the presence of the node pair "(2, 4)" in the candidate pairs list "C" would eliminate elements "(2, 3)" and "(3,4)" from the candidate pairs list "C," and the resultant scope would incorrectly be represented as node pair "(2, 4)" (e.g., {(2, 4)}), where in actuality the procedure correctly determines the scope to be "C={(2, 3), (3, 4)}."

Regarding Step (4), as described above, by removing unnecessary elements/node pairs from the candidate pairs list "C," the resultant scope is more compact. This compact representation of the scope may make any subsequent use or modification of the calculated scope more efficient.

Returning to the description of FIG. 7, as introduced above, two examples will now be provided to illustrate application of the scope computation procedure to a cyclic graph for purposes of scope selection computation in association with adaptive scoping of business processes. Regarding the first example application of the scope computation procedure to a cyclic graph, as can be seen within FIG. 7, the selection "S1" represented by the dashed-line representation 702 includes/encompasses a cyclic portion of the graph that represents the cyclic business model 700.

As such, for purposes of the present example, the selection "S1" includes several nodes (e.g., S={2, 3, 4, 5, 6, 8}). As described above, the first Step (1) of computational processing, the subgraph "$G_S$" represented by the selection "S1," is computed.

A candidate set of begin-end node pairs initially includes all combinations of pairs in the selection "S1." This results in an absolute value of the number of nodes squared (e.g., $|S|^2=6^2=36$) pairs.

As such, the second Step (2) of the computational processing includes computation of a set of candidate pairs "C" of nodes, as follows:

$$C = \begin{Bmatrix} (2,2), & (3,2), & (4,2), & (5,2), & (6,2), & (8,2), \\ (2,3), & (3,3), & (4,3), & (5,3), & (6,3), & (8,3), \\ (2,4), & (3,4), & (4,4), & (5,4), & (6,4), & (8,4), \\ (2,5), & (3,5), & (4,5), & (5,5), & (6,5), & (8,5), \\ (2,6), & (3,6), & (4,6), & (5,6), & (6,6), & (8,6), \\ (2,8), & (3,8), & (4,8), & (5,8), & (6,8), & (8,8) \end{Bmatrix}$$

It should be noted that it may not be intuitive as to why the "(8,-)" node-pairs are utilized by the computational processing, and these nodes may otherwise be overlooked without the computational rigors described herein. However, these nodes are utilized in some cases, such as for example a situation as described in the paragraph at the end of this example (see paragraph that references a "sub-example 1" described several paragraphs below), and these nodes are included to accommodate such cases.

The next Step (3.1) of the computational processing removes candidates for which there is no path in "$G_S$" based upon the set of candidate pairs "C." As such, after application of Step (3.1), the candidate pairs list "C" remains as follows:

$$C = \begin{Bmatrix} (2,2), & & & & & \\ (2,3), & (3,3), & (4,3), & (5,3), & & (8,3), \\ (2,4), & (3,4), & (4,4), & (5,4), & & (8,4), \\ (2,5), & (3,5), & (4,5), & (5,5), & & (8,5), \\ (2,6), & (3,6), & (4,6), & (5,6), & (6,6), & (8,6), \\ (2,8), & (3,8), & (4,8), & (5,8), & & (8,8) \end{Bmatrix}$$

As can be seen the Step (3.1) of the computational processing removes several node pairs from candidate pairs list "C" (e.g., removes (3, 2), (4, 2), (5, 2), (6, 2), (8, 2), (6, 3), (6, 4), (6, 5), and (6, 8)).

For this particular example, the next Step (3.2) of the computational processing, which as described above removes candidate pairs that remain in the candidate pairs list "C" that visit (e.g., that connect to) nodes that are not in the selection "S1," does not remove any node pairs because no such pairs exist within this example. As such, the candidate pairs list "C" is unchanged at this stage of computational processing within the present example.

The next Step (4) of the computational processing, which as described above removes redundant candidates from the candidate pairs list "C," results in the removal of all elements in the candidate pairs list "C" except the node pair "(2, 6)" (e.g., the start-end node pair), and the resultant scope is calculated as:

C={(2, 6)}

It should be noted to further describe the computational processing, that the element (2, 8) was removed by the Step (4) because, based upon the definition of valid paths described above, the path from the node (2) to the node (6) may include the node (8). In particular, there are two paths from the node (2) to the node (6), specifically the path (2, 3, 4, 5, 6), and the path (2, 3, 4, 5, 8, 3, 4, 5, 6). The latter path is a cyclic path. Additionally, the only path from the node (2) to the node (8) is the path (2, 3, 4, 5, 8). As such, the set of nodes visited "N(2, 6)" is a superset of the set of nodes visited "N(2, 8)" and the node pair "(2, 8)" may be removed from the candidate pairs list "C." As such, candidate node pairs with nodes visited that are a subset of nodes visited by other candidate node pairs may be removed. It should further be noted that a precise definition of paths using only node pairs allows for the scope to be represented by the single node pair "(2, 6)" as the computed scope definition.

Regarding the "sub-example 1" referenced above with respect to when the "(8,-)" node-pairs are utilized, consider the process in FIG. 7 with a selection identical to 702 in FIG. 7 except for the absence of node (5) and node (6). That is, the selection within this "sub-example 1" is S={2, 3, 4, 8}. In this case, applying the Procedure (1) would compute a scope of P={(2,4), (8,4)}. Since there is no path from any of the nodes in the selection to node (8), but there are paths from node (8) to other nodes in the selection, the "(8,-)" node pairs are included in the candidate set. Otherwise, there will be no node-pair with associated valid paths that include the node (8), and hence a correct scope would not be computed if the node pairs, such as the "(8,-)" node pairs, are omitted. Due to the possibility of cases such as this, the Procedure (1) includes all combinations of node-pairs in the candidate set, as described above.

Regarding the second example application of the scope computation procedure to a cyclic graph, as can be seen within FIG. 7, the selection "S2" represented by the dashed-line representation 704, does not include/encompass a cyclic portion of the graph that represents the cyclic business model 700.

As such, for purposes of the present example, the selection "S2" includes several nodes (e.g., S={2, 3, 4, 5, 6}). As described above, the first Step (1) of computational processing, the subgraph "$G_S$" represented by the selection "S2," is computed.

A candidate set of begin-end node pairs initially includes all combinations of pairs in the selection "S2." This results in an absolute value of the number of nodes squared (e.g., $|S|^2=5^2=25$) pairs.

As such, the second Step (2) of the computational processing includes computation of a set of candidate pairs "C" of nodes, as follows:

$$C = \begin{Bmatrix} (2,2), & (3,2), & (4,2), & (5,2), & (6,2), \\ (2,3), & (3,3), & (4,3), & (5,3), & (6,3), \\ (2,4), & (3,4), & (4,4), & (5,4), & (6,4), \\ (2,5), & (3,5), & (4,5), & (5,5), & (6,5), \\ (2,6), & (3,6), & (4,6), & (5,6), & (6,6) \end{Bmatrix}$$

The next Step (3.1) of the computational processing removes candidates for which there is no directed path in "$G_S$" based upon the set of candidate pairs "C." As such, after application of Step (3.1), the candidate pairs list "C" remains as follows:

$$C = \begin{Bmatrix} (2,2), & & & & \\ (2,3), & (3,3), & & & \\ (2,4), & (3,4), & (4,4), & & \\ (2,5), & (3,5), & (4,5), & (5,5), & \\ (2,6), & (3,6), & (4,6), & (5,6), & (6,6) \end{Bmatrix}$$

As can be seen the Step (3.1) of the computational processing removes several node pairs from the candidate pairs list "C" (e.g., removes (3, 2), (4, 2), (5, 2), (6, 2), (4, 3), (5, 3), (6, 3), (5, 4), (6, 4) and (6, 5)).

For this particular example, the next Step (3.2) of the computational processing, which as described above removes candidate pairs that remain in the candidate node pairs list "C" that visit (e.g., that connect to) nodes that are not in the selection "S2," removes only one node pair (e.g., the node pair (2, 6)) because only one such pair exists within this example. As such, the candidate pairs list "C" after execution of the Step (3.2) is:

$$C = \begin{Bmatrix} (2,2), & & & & \\ (2,3), & (3,3), & & & \\ (2,4), & (3,4), & (4,4), & & \\ (2,5), & (3,5), & (4,5), & (5,5), & \\ & (3,6), & (4,6), & (5,6), & (6,6) \end{Bmatrix}$$

To further describe the reason that the node pair "(2, 6)" is removed from the candidate pairs list "C," it should be noted that there is a path from the node (2) to the node (6) that includes the node (8). However, the node (8) is not in the selection "S2." In particular, based upon the definition of a valid path described above, this definition would allow the path "(2, 3, 4, 5, 8, 3, 4, 5, 6)" from the node (2) to the node (6), which is also noted to be a cyclic path. As such, by removal of the node pair "(2, 6)" from the candidate pairs list "C," this path is omitted from the calculation of the scope represented by the selection "S2."

Additionally, to further describe why the node pair "(3, 6)" is not removed from the candidate pairs list "C," it should be noted that the definition described above of paths only allows one path "(3, 4, 5, 6)" from the node (3) to the node (6). In particular, the node (8) is not considered to be in a valid path from the node (3) to the node (6) because a path through the node (8) would repeat the first node (e.g., the node (3)) in the path.

The next Step (4) of the computational processing, which as described above removes redundant candidates from the candidate pairs list "C," results in the removal of all elements in the candidate pairs list "C" except the node pairs "(2, 5)" and "(3, 6)" (e.g., the start-end node pairs), and the resultant scope is calculated as:

$$C = \begin{Bmatrix} (2,5), & \\ & (3,6) \end{Bmatrix}$$

It should be noted to further describe the computational processing, that the final scope here is not intuitively apparent from the visual graph or from the selection "S2."

Moreover, the precise definition of valid paths allows the node pairs "(2, 5)" and "(3, 6)" to accurately represent the scope.

Selection Computation Procedure

Regarding the selection computation procedure introduced above in FIG. 4, the following description details the selection computation procedure, as represented by the following Procedure (2).

Procedure (2):

Given:
    G—a connected, directed graph representing the process workflow
    P={(b, e)}—a set of (begin, end) node pairs computed by the scope computation procedure (the Procedure (1) described above)

Compute the resulting selection:
    S—a set of nodes included in the selection

Notation:
    Let N(p, q) represent the nodes visited in all paths from p to q in G
    Note: if p==q, then N(p, q)={p}

Procedure Steps:
    Step (1): S={ }//start out empty
    Step (2): For every (b, e) in P
        Step (2.1): S=S∪N(b, e)

The selection computation procedure operates such that each iteration of the loop in the Step (2) computes a set of nodes visited in all paths between the nodes in the node pair. It should be noted that the nodes visited by each node pair in the scope may not be unique. However, because the Step (2.1) takes the union of nodes, duplicate node pairs are eliminated/removed by the selection computation procedure. This processing is illustrated using the following example described in association with FIG. 9 for an acyclic graph and with reuse of FIG. 7 for a cyclic graph implementation.

Applying the Selection Computation Procedure to an Acyclic Graph

Figure 9:
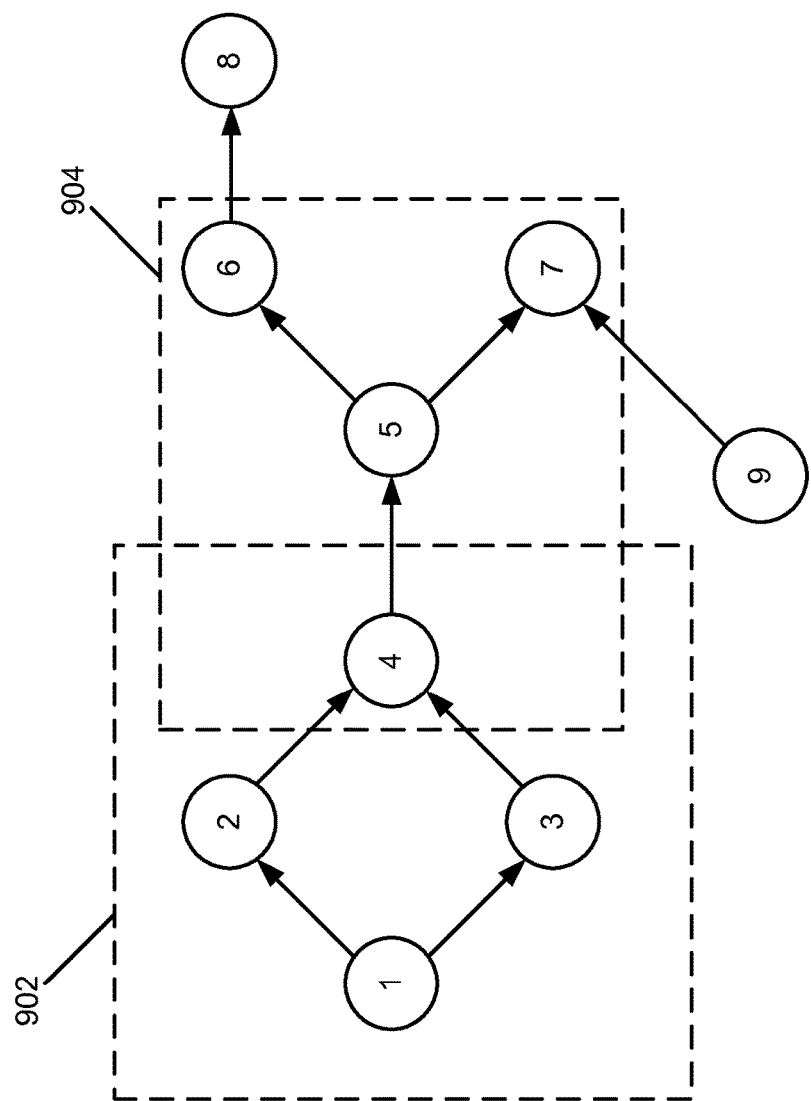
FIG. 9 is a graphical representation of an example of an implementation of an acyclic business model to illustrate application of the selection computation procedure to an acyclic graph for purposes of scope selection computation according to an embodiment of the present subject matter.

FIG. 9 is a graphical representation of an example of an implementation of an acyclic business model 900 that is described below to illustrate application of the selection computation procedure to an acyclic graph for purposes of scope selection computation. The acyclic business model 900 is illustrated to include a set of nodes (1 through 9) that are interconnected to form the acyclic business model 900. A dashed-line box 902 and a dashed-line box 904 represent a SCOPE_P1 to which the selection computation procedure will be applied for purposes of example. The SCOPE_P1 is defined as described herein by node pairs that represent sets of begin-end node pairs that may be computed using the scope computation procedure as described above. Within the present example, the SCOPE_P1 is represented by the following set of begin-end node pairs:

SCOPE_P1={(1, 4), (4, 6), (4, 7)}

As such, the SCOPE_P1 includes three begin-end node pairs, represented as a node pairs "(1, 4)", "(4, 6)", and "(4, 7)." The dashed-line box 904 includes two of these begin-end node pairs.

To apply the selection computation procedure to the acyclic business model 900 to determine the nodes of the acyclic business model 900 represented by the SCOPE_P1, the following sequence of steps may be performed by starting with the empty set "S" of nodes, as described above for Step (1) of Procedure (2) that represents the selection computation procedure:

Step (1) as applied:
    S={ }//start out empty

Next, a first iteration of the Step (2.1) of the selection computation procedure may be applied to the node pair "(1, 4)" as follows:

First iteration of Step (2.1) as applied to (b, e)=(1,4):
    S=S∪N(1, 4)
    S={ }∪{1,2,3,4}
    S={1, 2, 3, 4}

As can be seen from the example first iteration of the Step (2.1) of the selection computation procedure, a union of the nodes visited by the node pair "(1, 4)" with the empty set results in a set "S" of nodes after the first iteration includes nodes "{1, 2, 3, 4}," which are all nodes visited by the begin node (1) and the end node (4) of the node pair "(1, 4)."

A second iteration of the Step (2.1) of the selection computation procedure may be applied to the node pair "(4, 6)" as follows:

Second iteration of Step (2.1) as applied to (b, e)=(4, 6):
    S=S∪N(4, 6)
    S={1, 2, 3, 4} ∪ {4, 5, 6}
    S={1, 2, 3, 4, 5, 6}

As can be seen from the above second iteration of the Step (2.1) of the selection computation procedure, a union of the nodes visited by the node pair "(4, 6)" with the previously-calculated result set of nodes visited by the node pair "(1, 4)" results in a modified result set "S," including nodes "{1, 2, 3, 4, 5, 6}," which are all nodes visited by the start and end nodes of the node pair "(1, 4)" and the node pair "(4, 6)." It should be noted that duplicate nodes have been eliminated by the union operator (e.g., the duplicate node (4) has been removed).

A third iteration of the Step (2.1) of the selection computation procedure may be applied to the begin-end node pair "(4, 7)" as follows:

Third iteration of Step (2.1) as applied to (b, e)=(4, 7):
    S=S∪N(4, 7)
    S={1, 2, 3, 4, 5, 6} ∪ {4, 5, 7}
    S={1, 2, 3, 4, 5, 6, 7}

As can be seen from the above third iteration of the Step (2.1) of the selection computation procedure, a union of the nodes visited by the node pair "(4, 7)" with the previously-calculated result set of nodes visited by the node pairs "(1, 4)" and "(4, 6)" results in a modified result set "S," including nodes "{1, 2, 3, 4, 5, 6, 7}," which are all nodes visited by the start and end nodes of the node pairs "(1, 4)," "(4, 6)," and "(4, 7)," as defined for the scope. It should again be noted that duplicate nodes have been eliminated by the union operator (e.g., the duplicate nodes (4) and (5) have been removed).

As such, the scope computation procedure iteratively processes begin-end node pairs to identify all nodes visited by the begin-end node pairs and forms a non-duplicative union of all subsets of nodes visited by the respective begin-end node pairs that form the SCOPE_P1. Accordingly, using a compact scope representation calculated as described above, nodes represented by the scope may be efficiently calculated from the scope definition for an acyclic graph.

Applying the Selection Computation Procedure to a Cyclic Graph

Returning to the description of FIG. 7 to describe processing for application of the selection computation procedure to a cyclic graph represented by the cyclic business model 700, the dashed-line box 704 represents a SCOPE_P2 to which the selection computation procedure will be applied for purposes of example. The SCOPE_P2 is represented by the following set of begin-end node pairs:

SCOPE_P2={(2, 5), (3, 6)}

As can be seen from FIG. 7, the SCOPE_P2 includes two (begin, end) node pairs, represented as a node pairs "(2, 5)" and "(3, 6)." It should be noted that, while the SCOPE_P2 does not include a cyclic portion of the cyclic business model 700, the processing described herein for scope selection computation may be applied to such a scope definition (e.g., as described above for the dashed-line representation 702 that represents a selection "S1"). The dashed-line representation 702 may be defined by a single node pair (e.g., P={(2, 6)}, as described further below). The example described below implements the union aspect of selection computation processing and the SCOPE_P2 includes two (begin, end) node pairs to facilitate this example.

To apply the selection computation procedure to the cyclic business model 700 to determine the nodes of the cyclic business model 700 represented by the SCOPE_P2, the following sequence of steps may be performed by starting with the empty set "S" of nodes, as described above for Step (1) of Procedure (2) that represents the selection computation procedure:

Step (1) as applied:
S={ }//start out empty

Next, a first iteration of the Step (2.1) of the selection computation procedure may be applied to the node pair "(2, 5)" as follows:

First iteration of Step 2.1 as applied to (b, e)=(2, 5):
S=S∪N(2, 5)
S={ }∪{2, 3, 4, 5}
S={2, 3, 4, 5}

As can be seen from the example first iteration of the Step (2.1) of the selection computation procedure, a union of the nodes visited by the node pair "(2, 5)" with the empty set results in a set "S" of nodes after the first iteration includes nodes "{2, 3, 4, 5}," which are all nodes visited by the start and end nodes of the node pair "(2, 5)."

A second iteration of the Step (2.1) of the selection computation procedure may be applied to the node pair "(3, 6)" as follows:

Second iteration of Step 2.1 as applied to (b, e)=(3, 6):
S=S∪N(3, 6)
S={2, 3, 4, 5}∪{3, 4, 5, 6}
S={2, 3, 4, 5, 6}

As can be seen from the above second iteration of the Step (2.1) of the selection computation procedure, a union of the nodes visited by the node pair "(3, 6)" with the previously-calculated result set of nodes visited by the node pair "(2, 5)" results in a modified result set "S" after the second iteration includes nodes "{2, 3, 4, 5, 6}," which are all nodes visited by the start and end nodes of the node pair "(2, 5)" and the node pair "(3, 6)." It should be noted that duplicate nodes have been eliminated by the union operator (e.g., the duplicate nodes (3), (4), and (5) have been removed).

As such, the scope computation procedure iteratively processes node pairs to identify all nodes visited by the node pairs and forms a non-duplicative union of all subsets of node pairs visited by the respective node pairs that form the SCOPE_P2. Accordingly, using a compact scope representation calculated as described above, nodes represented by the scope may be efficiently calculated from the scope definition for a cyclic graph.

Scope Adaptation

For purposes of the present description, scope adaptation may be performed responsive to changes of a business model. Changes of a business model affect previously-calculated scope definitions. As such, scope adaptation may receive inputs and process the inputs to adapt the respective scope definitions to new resultant scope definitions. As introduced above with respect to the description of FIG. 5 and FIG. 6, two scope adaptation procedures will be described below. The first scope adaptation procedure is the passive scope adaptation procedure, which was introduced above in FIG. 5, and which may be applied within a componentized tool chain implementation where a modified graph of a process model (rather than incremental changes) are available. The second scope adaptation procedure is the active scope adaptation procedure, which was introduced above in FIG. 6, and which may be applied within a fully-integrated tool chain implementation where individual incremental changes to a process model are available via the fully-integrated tool chain. Reference is made to the introductory descriptions above with further detail provided by the computational descriptions and examples below.

Passive Scope Adaptation Procedure

Regarding the passive scope adaptation procedure introduced above in FIG. 5, the following description details the passive scope adaptation procedure, as represented by the following Procedure (3).

Procedure (3):

Given:
$G_{New}$—a connected, directed graph representing a "modified" process workflow
P={(b, e)}—a set of (begin, end) node pairs computed by the scope computation procedure on the "original" graph G Compute the resulting passively-adapted scope:
$P_{New}$—a new/resulting set of (begin, end) node pairs in the scope
$P_{Invalid}$—a set of (begin, end) node pairs in P that are now invalid Procedure Steps:
Step (1): $P_{New}=P_{Invalid}=\{\ \}$
Step (2): For each (p, q) in the original scope P
Step (2.1): If p or q does not exist in $G_{New}$, then
Step (2.1.1): $P_{Invalid}=P_{Invalid}\cup(p, q)$
Step (2.2): Else if there is no path from p to q in $G_{New}$ then
Step (2.2.1): $P_{Invalid}=P_{Invalid}\cup(p, q)$
Step (2.3): Else
Step (2.3.1): $P_{New}=P_{New}\cup(p, q)$ The passive scope adaptation procedure (Procedure (3) above) computes both the new scope ($P_{New}$), and the elements of the old scope that are no longer valid ($P_{Invalid}$). It should be noted that the resultant scope ($P_{New}$) may be used to compute a selection on the modified graph using the selection computation procedure (Procedure (2) described above). It should also be noted that the resultant scope ($P_{Invalid}$) may be used to ask the user to redefine these now invalid scope elements.

It should additionally be noted that if the resultant scope ($P_{New}$) equals the original scope (P) (e.g., $P_{New}$=P), then the entire scope is considered valid under the passive scope adaptation procedure. This is also equivalent to checking to determine whether the resultant scope ($P_{Invalid}$) is null or an empty set (e.g., if $P_{Invalid}=\{\ \}$).

It should further be noted that in the passive scope adaptation procedure, the resultant scope ($P_{New}$) will always be a subset of the original scope (P). As such, the elements in the original scope are not modified by use of the passive scope adaptation procedure.

With reference to the passive scope adaptation procedure (Procedure (3) above), Step (1) assigns an empty set (e.g., { }) to each of the resultant scope ($P_{New}$) and the resultant scope ($P_{Invalid}$) as initial conditions. As such, iterative processing of the original scope definition begin-end node pairs to adapt the original scope definition based upon the modified graph of the business process will result in population of the resultant scope ($P_{New}$) with begin-end node pairs that are still valid and will result in population of the resultant scope ($P_{Invalid}$) with begin-end node pairs that are no longer valid.

Step (2) initiates iterative processing of each begin-end node pairs within the original scope definition (P). Step (2.1) checks for the case where either the start or end node in a begin-end node pair has been deleted by the modification to the business process. In this case, the original scope may be considered invalid.

Step (2.2) processes a situation where the original scope is modified to a degree that there is no longer a path between a given defined begin-end node pair. In this case, the original scope may also be considered invalid. It should be noted that Step (2.1) is checked before Step (2.2) because the computation of visited nodes (e.g., N(p, q)) is undefined in a situation of Step (2.2) if either the begin node (p) or the end node (q) is missing from the modified graph.

If neither of Step (2.1) nor Step (2.2) is true (e.g., the given begin-end node pair exists and there is at least one path between the begin-end node pair in the modified graph), then Step (2.3) will be true. In this situation, the original scope is still valid in the modified graph. It should be noted that the cases checked in Step (2) are considered mutually exclusive and exhaustive, in that exactly one of the cases is true in each iteration of the loop of the passive scope adaptation procedure (Procedure (3) above).

As such, and as a result of processing the original scope (P) using the passive scope adaptation procedure, the resultant scope ($P_{New}$) will include any begin-end node pairs of the original scope (P) that are still valid and the resultant scope ($P_{Invalid}$) will include any begin-end node pairs of the original scope (P) that are no longer valid.

Applying the Passive Scope Adaptation Procedure to an Acyclic Graph

It should be noted that the present example exercises the Step (2.2) and the Step (2.3) of the passive scope adaptation procedure (Procedure (3) described above). For purposes of the present example, FIG. 9 described above is considered the original graph (G) of the acyclic business model 900. Further, the original scope (P) is, as described above, the SCOPE_P1 (e.g., SCOPE_P1={(1, 4), (4, 6), (4, 7)}).

Figure 10:
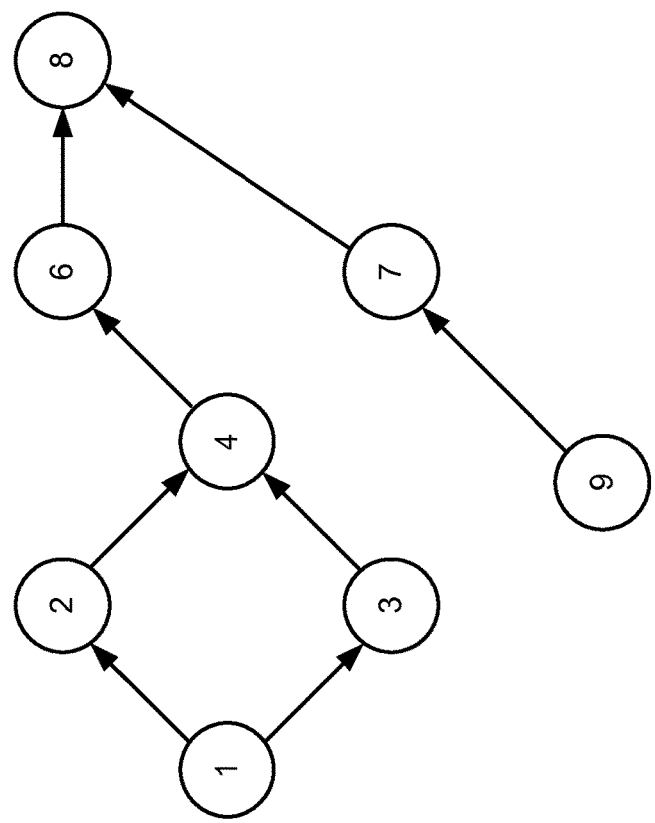
FIG. 10 is a graphical representation of an example of an implementation of a modified acyclic business model to illustrate application of the passive scope adaptation procedure to an acyclic graph for purposes of node-pair process scope definition adaptation according to an embodiment of the present subject matter.

FIG. 10 is a graphical representation of an example of an implementation of a modified acyclic business model 1000 that is described below to illustrate application of the passive scope adaptation procedure to an acyclic graph for purposes of node-pair process scope definition adaptation. As can be seen from FIG. 10 in comparison to FIG. 9, the node (5) has been removed from the acyclic business model 900 to form the resultant modified acyclic business model 1000. Further, there is no longer a path between the previous begin-end node pair "(4, 7)," which will exercise the Step (2.2) of the passive scope adaptation procedure described above by the Procedure (3).

It should be noted that the original graph (G) illustrated as described above in FIG. 9 with the acyclic business model 900 is not an input to the passive scope adaptation procedure, and is referenced here for illustrative purposes. Further, the original scope definition of the SCOPE_P1 described above, as computed for the selection represented by the dashed-line box 902 and the dashed-line box 904 within FIG. 9, is input to the passive scope adaptation procedure along with the modified acyclic business model 1000. Please recall that, as described above, nodes (8) and (9) were not included in the original selection from which the SCOPE_P1 was computed. No dashed-line boxes are illustrated in FIG. 10 because a new scope definition has not yet been calculated at this point in the processing.

As such, for purposes of the present example, the modified acyclic business model 1000 is considered the new/modified graph ($G_{New}$) that is input to the passive scope adaptation procedure, along with the original scope definition of the SCOPE_P1. As such, for purposes of the present example:

$G_{New}$=modified acyclic business model 1000
SCOPE_P1={(1, 4), (4, 6), (4, 7)}=the original calculated scope definition To apply the passive scope adaptation procedure to the modified acyclic business model 1000 to determine the new resultant scope ($P_{New}$) and the new resultant scope ($P_{invalid}$), the following sequence of steps may be performed. Processing for the passive scope adaptation procedure begins by assigning the empty set of nodes (e.g., { }) to each of the resultant scope ($P_{New}$) and the resultant scope ($P_{Invalid}$), as described above for Step (1) of Procedure (3) that represents the passive scope adaptation procedure:

Step (1) as applied:
$P_{New}$={ }//start out empty
$P_{Invalid}$={ }//start out empty A first iteration of the Step (2) of the passive scope adaptation procedure for the first begin-end node pair of the original scope (P=SCOPE_P1) as defined above to be represented by the node pair "(p, q)=(1, 4)," results in the following:

$P_{New}$=$P_{New}$∪(p, q)
$P_{New}$={ }∪(1, 4)
$P_{New}$={(1, 4)}

It should be noted that the Step (2.3) of the passive scope adaptation procedure represented above by Procedure (3) is true in this case because the nodes (1) and (4) are still in the modified acyclic business model 1000 ($G_{New}$), and there is a path from the node (1) to the node (4) in the modified acyclic business model 1000 as can be seen from FIG. 10.

A second iteration of the Step (2) of the passive scope adaptation procedure for the second begin-end node pair of the original scope (P=SCOPE_P1) as defined above to be represented by the node pair "(p, q)=(4, 6)," results in the following:

$P_{New}$=$P_{New}$∪(p, q)
$P_{New}$={(1, 4)}∪(4, 6)
$P_{New}$={(1, 4), (4, 6)}

It should again be noted that the Step (2.3) of the passive scope adaptation procedure represented above by Procedure (3) is true in this case because the nodes (4) and (6) are still in the modified acyclic business model 1000 ($G_{New}$), and there is a path from the node (4) to the node (6) in the modified acyclic business model 1000 as can be seen from FIG. 10. It should also be noted that the path between the node (4) and the node (6) is a different path in view of the absence of the previous node (5), but this does not invalidate the inclusion of the node pair "(4, 6)" in the new scope.

A third iteration of the Step (2) of the passive scope adaptation procedure for the third begin-end node pair of the original scope (P=SCOPE_P1) as defined above to be represented by the node pair "(p, q)=(4, 7)," results in the following:

$P_{New}$=$P_{New}$ (Unchanged)={(1, 4), (4, 6)}
$P_{Invalid}$=$P_{Invalid}$∪(p, q)
$P_{Invalid}$={ }∪(4, 7)

It should once again be noted that in this portion of the present example, the Step (2.2) of the passive scope adaptation procedure represented above by Procedure (3) is true in this case because, while the nodes (4) and (7) are still in the modified acyclic business model 1000 ($G_{New}$) (as confirmed by the Step 2.1), there is no longer a path from the node (4) to the node (7) in the modified acyclic business model 1000 as can be seen from FIG. 10. As such, the node pair "(4, 7)" is not added to the new scope, and is instead added to the invalid scope ($P_{Invalid}$).

The results of processing the modified acyclic business model 1000 ($G_{New}$) using the passive scope adaptation procedure is as follows:

$P_{New}$={(1, 4), (4, 6)}
$P_{Invalid}$={(4, 7)}

As such, the modified acyclic business process 1000 and the original scope (SCOPE_P1) have been processed to arrive at a new resultant scope ($P_{New}$) that does not include the original begin-end node pair "(4, 7)."

It should be noted that, as described above, where either node of a begin-end node pair is not represented in a modified graph, that node pair would be included in the invalid scope ($P_{Invalid}$) by the Step (2.1) of the passive scope adaptation procedure. For example, if the modified acyclic business process 1000 no longer included the node (1), then that original begin-end node pair of "(1, 4)" would cause processing of the Step (2.1) of the passive scope adaptation procedure. The result would be that the begin-end node pair of "(1, 4)" would not be included in the new scope ($P_{New}$), but would instead be included in the invalid scope ($P_{Invalid}$). Within such a situation, the results of processing the modified acyclic business model 1000 ($G_{New}$) using the passive scope adaptation procedure would be as follows:

$P_{New}$={(4, 6)}
$P_{Invalid}$={(1, 4), (4, 7)}

As such, in the situation described in the preceding paragraph, the resultant new scope ($P_{New}$) resolves to a single begin-end node pair "(4, 6)." This additional example illustrates processing of the Step (2.1) of the passive scope adaptation procedure.

Active Scope Adaptation Procedure

Regarding the active scope adaptation procedure introduced above in FIG. 6, the following description details the active scope adaptation procedure, as represented by the following Procedure (4). It should be noted that, for purposes of the present description, a modification to a graph of a business model may include any of adding a node, deleting a node, adding an edge (e.g., connection), and deleting an edge from a business model.

It should additionally be noted that, to reduce complexity of the present description, the active scope adaptation procedure is described with respect to adaptation of a scope to one modification (e.g., the $i^{th}$ modification) to a graph. The active scope adaptation procedure may be repeated for each modification to the graph. Further, the output scope of any modification ($P_i$) from the ($i^{th}$) run of the active scope adaptation procedure becomes the input to the next run of the active scope adaptation procedure. Accordingly, the following description may be repeated as appropriate for the given implementation.

The active scope adaptation procedure, as such, is represented by the following Procedure (4).

Procedure (4):
Given:
G—the original graph
$G_1, \ldots, G_K$—a sequence of graphs that represent each "modification" of the "original" graph G P={(b, e)}—a set of (begin, end) node pairs computed by the scope computation procedure on the "original" graph G Compute the resulting actively-adapted scope:
$P_K$—the new set of (begin, end) node pairs in the scope that apply to the final modified graph $G_K$ Notation:
For convenience, let $G_0$ refer to the original graph G
For convenience, let $P_0$ refer to the original scope P
Let succ(p, G) be the set of successors of begin nodes (p) in a given graph G
Let pred(q, G) be the set of predecessors of end nodes (q) in a given graph G
Let N(p, q, G) be the nodes visited in all paths from begin nodes (p) to end nodes (q) in a given graph G (e.g., that is, N(p, q, G) is N(p, q) applied to the given graph G)

Procedure Steps (where 1<=i<=K):
Step (1): $P_i$={ }
Step (2): For each (p, q) in the scope $P_{i-1}$
Step (2.1): if p does not exist in $G_i$, then
Step (2.1.1): for each node n in succ(p, $G_{i-1}$)
Step (2.1.1.1): $P_i=P_i\cup$(n, q)
Step (2.2): else if q does not exist in $G_i$, then
Step (2.2.1): for each node n in pred(q, $G_{i-1}$)
Step (2.2.1.1): $P_i=P_i\cup$(p, n)
Step (2.3): else if N(p, q, $G_{i-1}$) is not a subset of the nodes in $G_i$ then
Step (2.3.1): let N' be the subset of N(p, q,$G_{i-1}$) that is also in $G_i$
Step (2.3.2): Use the Scope Computation Procedure to compute a scope P' given the selection of nodes N'and graph $G_i$
Step (2.3.3): $P_i=P_i\cup P'$
Step (2.4): else
Step (2.4.1): $P_i=P_i\cup$(p, q)

It should be noted that, unlike the passive scope adaptation procedure described further above, the active scope adaptation procedure produces a valid scope and does not produce an invalid scope.

Regarding the computational steps of the active scope adaptation procedure, the Step (2.1) and the Step (2.2), respectively, manage situations where the begin node or end node of boundary begin-end node pairs of the scope have been deleted. In such a situation, the respective node pairs are removed from the scope.

The Step (2.3) manages situations where modifications may otherwise cause a scope to become invalid. It should be noted that the Step (2.3) re-computes a scope based on the selection of nodes that remain in the graph. The practical impact of this computational Step (2.3) is illustrated in the following example application of the active scope adaptation procedure described further below.

If none of the previous Steps (2.1) through (2.3) are true during an iteration of the active scope adaptation procedure, then the Step (2.4) is true. In this situation, the current node pair is added to the calculated scope.

It should be noted that the Step (2.1) and the Step (2.2) represent computational optimizations. The classes of graph modification checks performed by the Step (2.1) and the Step (2.2) may alternatively be managed by the Step (2.3). However, efficiency of computational processing may be improved by use of the Step (2.1) and the Step (2.2).

Applying the Active Scope Adaptation Procedure to an Acyclic Graph

It should be noted that the present example exercises the Step (2.1) and the Step (2.4) of the active scope adaptation procedure (Procedure (4) described above). For purposes of the present example, FIG. 9 described above is again considered the original graph (G) of the acyclic business model 900. Further, the original scope (P) is as described above as the SCOPE_P1 (e.g., SCOPE_P1={(1, 4), (4, 6), (4, 7)}).

Figure 11:
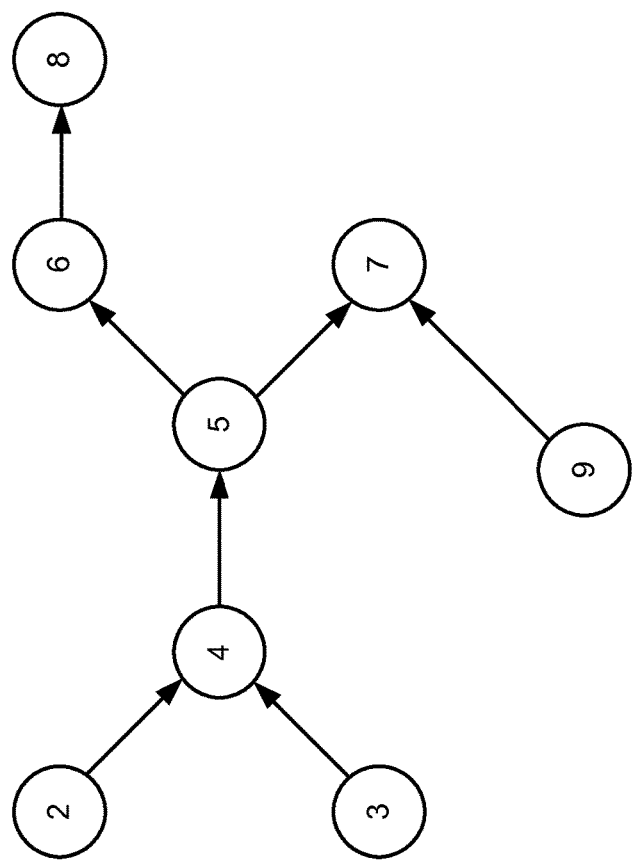
FIG. 11 is a graphical representation of an example of an implementation of a modified acyclic business model to illustrate application of the active scope adaptation procedure to an acyclic graph for purposes of node-pair process scope definition adaptation according to an embodiment of the present subject matter.

FIG. 11 is a graphical representation of an example of an implementation of a modified acyclic business model 1100 that is described below to illustrate application of the active scope adaptation procedure to an acyclic graph for purposes of node-pair process scope definition adaptation. As can be seen from FIG. 11 in comparison to FIG. 9, the node (1) has been removed from the acyclic business model 900 to form the resultant modified acyclic business model 1100.

It should be noted that the original graph (G) illustrated as described above in FIG. 9 with the acyclic business model 900 is an input to the active scope adaptation procedure, and is referenced here for illustrative purposes. Further, the modified acyclic business model 1100 is considered the new/modified graph ($G_1$) that is also input to the active scope adaptation procedure, along with the original scope definition of the SCOPE_P1, as computed for the selection represented by the dashed-line box 902 and the dashed-line box 904 within FIG. 9. Please recall again that, as described above, nodes (8) and (9) were not included in the original selection from which the SCOPE_P1 was computed. No dashed-line boxes are illustrated in FIG. 11 because a new scope definition has not yet been calculated at this point in the processing.

Please recall that, as described above, the original scope and original graph are referred to with the subscript zero (0) with respect to the active scope adaptation procedure (e.g., $P_0$ and $G_0$, respectively). As such, for purposes of the present example:

$G_0$=acyclic business model 900
$G_1$=modified acyclic business model 1100
SCOPE_P1=$P_0$={(1, 4), (4, 6), (4, 7)}=the original calculated scope definition To apply the active scope adaptation procedure to the modified acyclic business model 1100 to determine the new resultant iteration of the scope ($P_1$), the following sequence of steps may be performed. Processing for the active scope adaptation procedure begins by assigning the empty set of nodes (e.g., { }) to the resultant scope ($P_1$), as described above for Step (1) of Procedure (4) that represents the active scope adaptation procedure:

Step (1) as applied:
$P_1$={ }//start out empty

A first iteration of the Step (2) of the active scope adaptation procedure is applied to the first begin-end node pair "(1, 4)" in the original SCOPE_P1 (e.g., for (p, q)=(1, 4)). It should be noted that the Step (2.1) will be true in this case because the begin node (1) (e.g., where p=1 for this iteration) is not in the modified graph ($G_1$). Further, the successor nodes (e.g., "successors") of the node (1) in the original graph ($G_0$) (e.g., graph $G_{i-1}$ for as described above) are the node (2) and the node (3), as follows:

succ(1, $G_{i-1}$)={2, 3}

A first iteration of the Step (2.1.1) of the active scope adaptation procedure for the successor node (2) (e.g., where n=2) of the original graph ($G_0$) results in the following:
$P_1$={ }∪{(2,4)}
$P_1$={(2, 4)}

A second iteration of the Step (2.1.1) of the active scope adaptation procedure for the successor node (3) (e.g., where n=3) of the original graph ($G_0$) results in the following:
$P_1$={(2, 4)}∪{(3, 4)}
$P_1$={(2, 4), (3, 4)}

As such, the portion of the original scope represented by the begin-end node pair "(1, 4)" has been actively adapted incrementally by this iteration to the new begin-end node pairs "(2, 4)" and "(3, 4)." It should further be noted that the original scope represented by the begin-end node pair "(1, 4)" has become two begin-end node pairs "(2, 4)" and "(3, 4)" as a result of the active adaption of the original begin-end node pair "(1, 4)" based upon the changes represented in the modified graph ($G_1$).

A second iteration of the Step (2) of the active scope adaptation procedure is applied to the second begin-end node pair "(4, 6)" in the original SCOPE_P1 (e.g., for (p, q)=(4, 6)). It should be noted that the Step (2.4) will be true in this case because the begin node (4) (e.g., where p=4 for this iteration) is still in the modified graph ($G_1$), because the end node (6) (e.g., where q=6 for this iteration) is still in the modified graph ($G_1$), and because the visited nodes of the node pair "(4, 6)" are node (4), node (5), and node (6) (e.g., N(4, 6, $G_0$)={4, 5, 6}), which is a subset of the nodes in $G_1$. Applying the Step (2.4) to the node pair "(4, 6)" results, as follows:
$P_1$={(2, 4), (3, 4)}∪(4, 6)
$P_1$={(2, 4), (3, 4), (4, 6)}

As such, the begin-end node pair "(4, 6)" has been incorporated by union into the new adapted scope definition.

A third iteration of the Step (2) of the active scope adaptation procedure is applied to the third begin-end node pair "(4, 7)" in the original SCOPE_P1 (e.g., for (p, q)=(4, 7)). It should be noted that the Step (2.4) will also be true in this case because the begin node (4) (e.g., where p=4 for this iteration) is still in the modified graph ($G_1$), because the end node (7) (e.g., where q=7 for this iteration) is still in the modified graph ($G_1$), and because the visited nodes of the node pair "(4, 7)" are node (4), node (5), and node (7) (e.g., N(4, 7, $G_0$)={4, 5, 7}), which is a subset of the nodes in $G_1$. Applying the Step (2.4) to the node pair "(4, 7)" results, as follows:
$P_1$={(2, 4), (3, 4), (4, 6)}∪(4, 7)
$P_1$={(2, 4), (3, 4), (4, 6), (4, 7)}

As such, the begin-end node pair "(4, 7)" has been incorporated by union into the new adapted scope definition, which represents the final result of the active scope adaption performed by application of the active scope adaptation procedure.

Applying the Active Scope Adaptation Procedure to a Cyclic Graph

It should be noted that the present example exercises the Step (2.3) of the active scope adaptation procedure (Procedure (4) described above). For purposes of the present example, FIG. 7 described above is considered the original graph (G) of the cyclic business model 700. Further, the original scope (P) is as described above as the dashed-line representation 702 within FIG. 7 of the selection "S1" (e.g., P={(2, 6)}). Please recall again that, as described above, nodes (1) and (7) were not included in the original selection from which the scope "P" was computed. No dashed-line boxes are illustrated in FIG. 12 described below because a new scope definition has not yet been calculated at this point in the processing.

Figure 12:
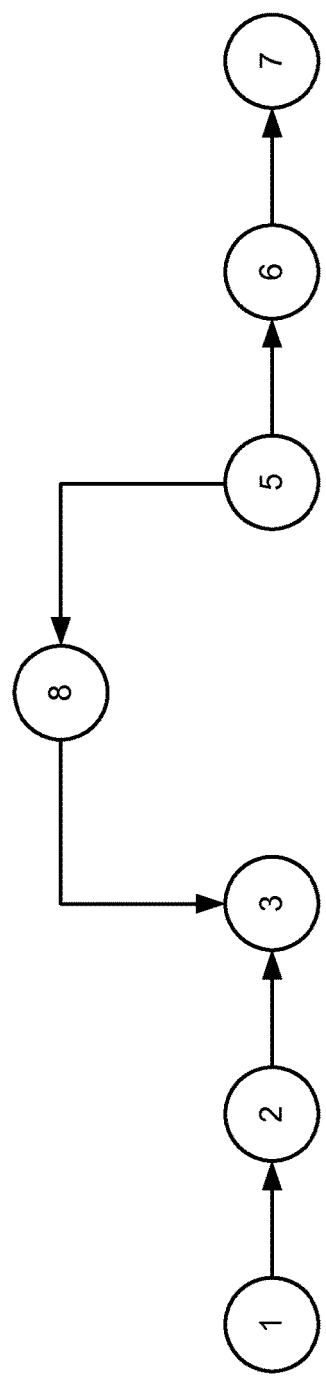
FIG. 12 is a graphical representation of an example of an implementation of a modified cyclic business model to illustrate application of the active scope adaptation procedure to a cyclic graph for purposes of node-pair process scope definition adaptation according to an embodiment of the present subject matter.

FIG. 12 is a graphical representation of an example of an implementation of a modified cyclic business model 1200 that is described below to illustrate application of the active scope adaptation procedure to a cyclic graph for purposes of node-pair process scope definition adaptation. As can be seen from FIG. 12 in comparison to FIG. 7, the node (4) has been removed from the cyclic business model 700 to form the resultant modified cyclic business model 1200.

It should be noted that the original graph (G) illustrated as described above in FIG. 7 with the cyclic business model 700 is an input to the active scope adaptation procedure, and is referenced here for illustrative purposes. Further, the modified cyclic business model 1200 is considered the new/modified graph ($G_1$) that is also an input to the active scope adaptation procedure, along with the original scope definition of the scope (P).

As such, for purposes of the present example:

$G_0$=cyclic business model 700
$G_1$=modified cyclic business model 1200
P={(2, 6)}=the original calculated scope definition To apply the active scope adaptation procedure to the modified cyclic business model 1200 to determine the new resultant iteration of the scope ($P_1$), the following sequence of steps may be performed. Processing for the active scope adaptation procedure begins by assigning the empty set of nodes (e.g., { }) to the resultant scope ($P_1$), as described above for Step (1) of Procedure (4) that represents the active scope adaptation procedure:

Step (1) as applied:

$P_1$={ }//start out empty

A first iteration of the Step (2) of the active scope adaptation procedure (and the only iteration of this step in this particular example) is applied to the first/only begin-end node pair "(2, 6)" in the original (P) (e.g., for (p, q)=(2, 6)). It should be noted that the Step (2.3) will be true in this case because the begin node (2) (e.g., where p=2 for this iteration) is still in the modified graph ($G_1$), because the end node (6) (e.g., where q=6 for this iteration) is still in the modified graph ($G_1$), and because the set of visited nodes of the node pair "(2, 6)" is not a subset of the nodes in $G_1$ (e.g., N(2, 6, $G_0$)={2, 3, 4, 5, 6, 8} is not in $G_1$).

Applying the Step (2.3.1) of the active scope adaptation procedure to the new/modified graph ($G_1$) results in a subset of the nodes N(2, 6, $G_0$) that are also in the new/modified graph ($G_1$), meaning a subset of the nodes visited in the original graph (G), as follows:

N'={2, 3, 5, 6, 8}

As can be seen, the new set of nodes visited (N') is a subset of the nodes visited (N) in the original graph (G) (e.g., a subset of the nodes N(2, 6, $G_0$)={2, 3, 4, 5, 6, 8}).

Applying the Step (2.3.2) of the active scope adaptation procedure to the new/modified graph ($G_1$), the scope computation procedure (the Procedure (2) above) is used to compute a revised scope (P') given the selection of nodes (N') and the new/modified graph ($G_1$), as follows:

P'={(2, 3), (5, 6), (5, 3)}

It should be noted that the begin-end node pairs in the revised scope (P') include three new begin-end node pairs "(2, 3)," "(5, 6)," and "(5, 3)" that have been created to capture the new scope definition for the modified cyclic business model 1200.

Applying the Step (2.3.3) of the active scope adaptation procedure to the new/modified graph ($G_1$), the resultant actively adapted scope is as follows:

$P_1$=$P_1$∪P'
$P_1$={ }∪{(2, 3), (5, 6), (5, 3)}
$P_1$={(2, 3), (5, 6), (5, 3)}

As such, the original scope definition has been actively modified using the original scope, the original graph, and a modified graph as inputs. A new scope has been defined by the active scope adaptation provided by the active scope adaptation procedure.

FIG. 13 through FIG. 18B described below represent example processes that may be executed by devices, such as the core processing module 200, to perform the adaptive scoping of business processes associated with the present subject matter. Many other variations on the example processes are possible and all are considered within the scope of the present subject matter. The example processes may be performed by modules, such as the scope definition and adaptation module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

Figure 13:
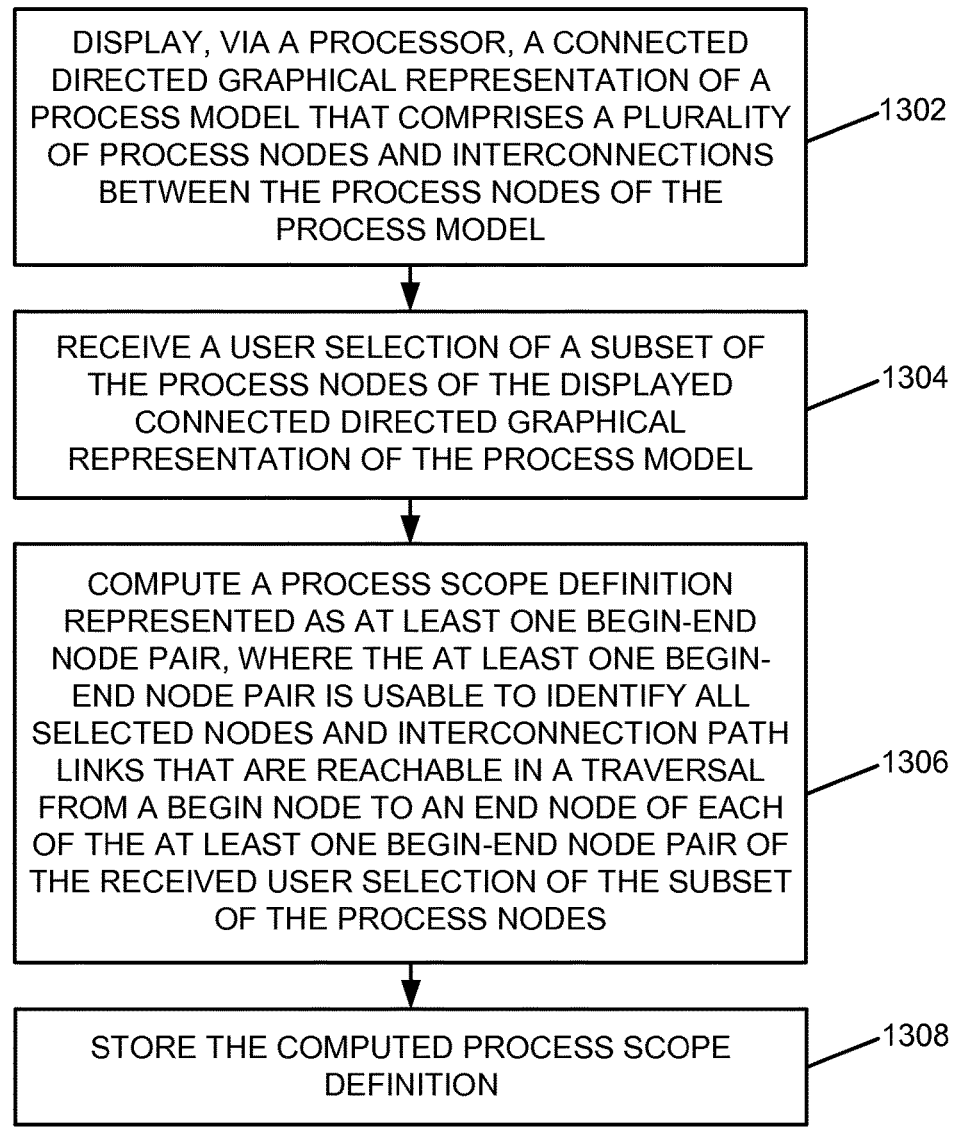
FIG. 13 is a flow chart of an example of an implementation of a process for node-pair process scope definition according to an embodiment of the present subject matter.

FIG. 13 is a flow chart of an example of an implementation of a process 1300 for node-pair process scope definition. At block 1302, the process 1300 displays, via a processor, a connected directed graphical representation of a process model that comprises a plurality of process nodes and interconnections between the process nodes of the process model. At block 1304, the process 1300 receives a user selection of a subset of the process nodes of the displayed connected directed graphical representation of the process model. At block 1306, the process 1300 computes a process scope definition represented as at least one begin-end node pair, where the at least one begin-end node pair is usable to identify all selected nodes and interconnection path links that are reachable in a traversal from a begin node to an end node of each of the at least one begin-end node pair of the received user selection of the subset of the process nodes. At block 1308, the process 1300 stores the computed process scope definition.

Figure 14:
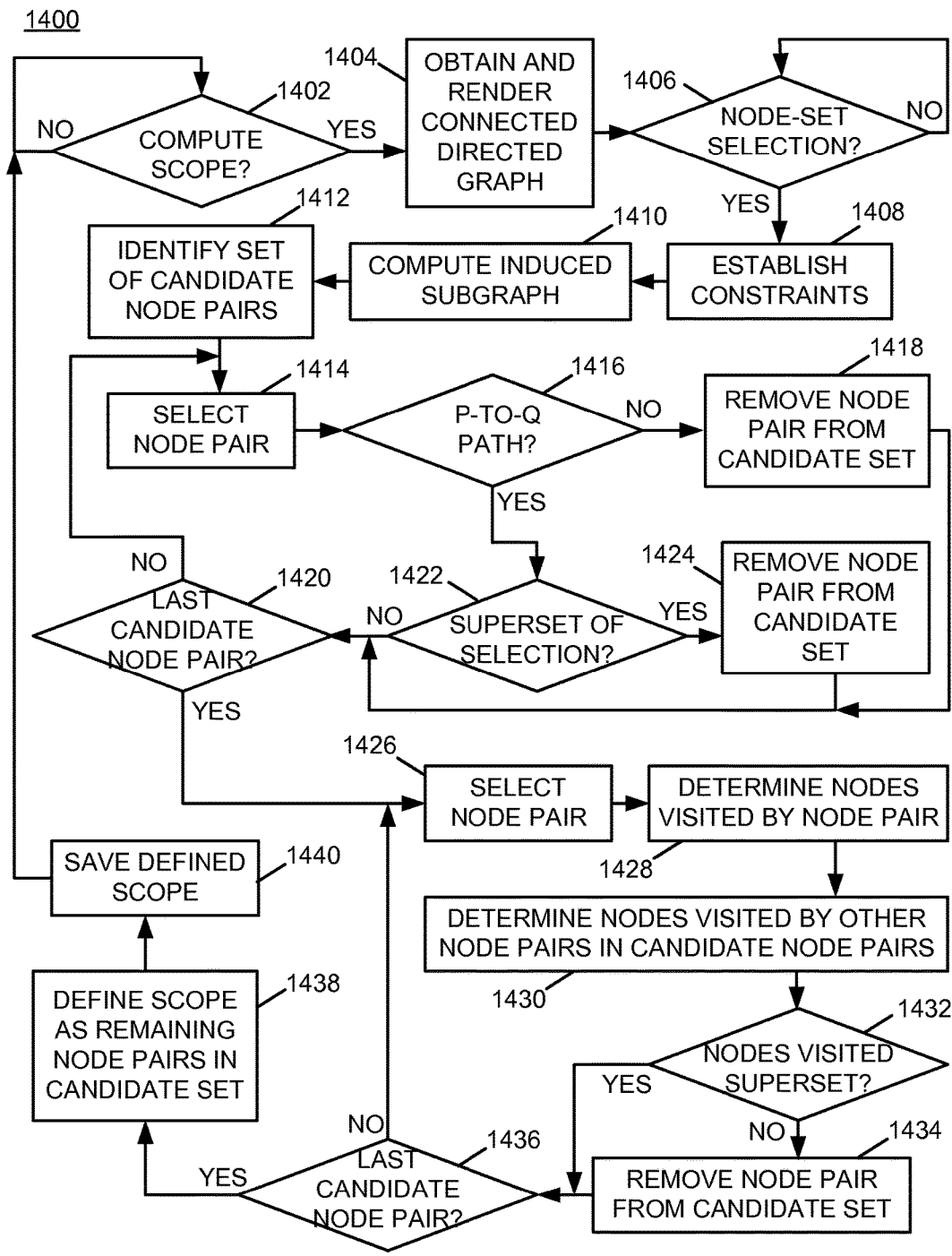
FIG. 14 is a flow chart of an example of an implementation of a process for node-pair process scope definition that utilizes a computed induced subgraph and candidate node pairs sets to compute scope definitions according to an embodiment of the present subject matter.

FIG. 14 is a flow chart of an example of an implementation of a process 1400 for node-pair process scope definition that utilizes a computed induced subgraph and candidate node pairs sets to compute scope definitions. The process 1400 represents an example implementation of the Procedure (1) described above that may be implemented by a computing device to perform scope computation processing.

At decision point 1402, the process 1400 makes a determination as to whether a request to compute a scope definition has been detected. A request to compute a scope definition may be detected, for example, in response to user input via a graphical user interface (GUI) or other input device, as appropriate for a given implementation.

In response to determining that a request to compute a scope definition has been detected, the process 1400 obtains and renders a connected directed graph specified in association with the detected request to compute the scope definition at block 1404. At decision point 1406, the process 1400 makes a determination as to whether a node-set selection has been detected (e.g., a selection S, as described above for the Procedure (1)). As described above, a user may graphically select a set of nodes for which to have a scope definition calculated. As such, the processing at decision point 1406 may detect such a selection of a node set.

In response to determining that a node-set selection has been detected, the process 1400 establishes constraints for operation on the selected node set at block 1408, such as those constraints described above in association with the Procedure (1) for scope computation. At block 1410, given the selection (S), the process 1400 computes an induced subgraph ($G_S$), as also described above in the Step (1) of the Procedure (1) described above.

At block 1412, the process 1400 identifies a set of candidate node pairs for the computed scope definition, as described above in association with the Step (2) of the Procedure (1) described above. At block 1414, the process 1400 selects a first candidate node pair of the set of candidate node pairs, and begins iterating to compute the scope definition. As such, this processing begins processing of the Step (3) of the Procedure (1) described above.

At decision point 1416, the process 1400 makes a determination as to whether there is a path from the begin node (p) to the end node (q) in the selected candidate node pair within the induced subgraph ($G_S$) to facilitate processing of the Step (3.1) of the Procedure (1), as described above. In response to determining that there is not a path from the begin node (p) to the end node (q) in the selected candidate node pair within the induced subgraph ($G_S$), the process 1400 removes the candidate node pair from the candidate set at block 1418, as described above in association with the Step (3.1.1) of the Procedure (1). In response to removing the candidate node pair from the candidate set at block 1418, the process 1400 makes a determination at decision point 1420 as to whether the last of the candidate node pairs has been processed. An affirmative determination at decision point 1420 will be described in detail further below. In response to determining that the last of the candidate node pairs has not been processed at decision point 1420, the process 1400 returns to block 1414 to select the next candidate node pair in the candidate set and iterates as described above.

Returning to the description of decision point 1416, in response to determining that there is a path from the begin node (p) to the end node (q) in the selected candidate node pair within the induced subgraph ($G_S$), the process 1400 makes a determination at decision point 1422 as to whether the nodes visited (N(p, q)) by the candidate node pair is a proper superset of the selection (S) in the subgraph ($G_S$) to implement the Step (3.2) of the Procedure (1). In response to determining at decision point 1422 that the nodes visited (N(p, q)) by the candidate node pair is not a proper superset of the selection (S) in the subgraph ($G_S$), the process 1400 removes the node pair from the candidate set at block 1424, as described above in association with the Step (3.2.1) of the Procedure (1). In response to removing the candidate node pair from the candidate set at block 1424, or in response to determining at decision point 1422 that the nodes (N(p, q)) visited by the candidate node pair is a proper superset of the selection (S) in the subgraph ($G_S$), the process 1400 returns to block 1420 to make a determination as to whether the last of the candidate node pairs has been processed.

In response to determining that the last of the candidate node pairs has not been processed at decision point 1420, the process 1400 returns again to block 1414 to select the next candidate node pair in the candidate set and iterates as described above. As such, the process 1400 iterates through the candidate node pairs based upon the Constraint (1) and the Constraint (2) described above for the Procedure (1).

Returning to the description of decision point 1420, for purposes of the present example, it is assumed that at least one node pair remains in the candidate set after the processing described above. As such, in response to determining at decision point 1420 that the last of the candidate node pairs has been processed using the Constraint (1) and the Constraint (2) described above for the Procedure (1), the process 1400 selects a first remaining node pair from the remaining node pairs in the candidate set at block 1426 to implement the Step (4) of the Procedure (1) as described above.

At block 1428, the process 1400 determines the nodes visited by the selected node pair. At block 1430, the process 1400 determines nodes visited by other node pairs in the set of candidate node pairs. This process acquires information with which to implement the Step (4.1) of the Procedure (1) as described above. As such, at decision point 1432, the process 1400 makes a determination as to whether the nodes visited by the other node pairs in the set of candidate node pairs is a proper superset of the nodes visited by the selected node pair to implement the Step (4.1) of the Procedure (1) as described above.

In response to determining that the nodes visited by the other node pairs in the set of candidate node pairs is not a proper superset of the nodes visited by the selected node pair, the process 1400 removes the selected node pair from the candidate set at block 1434 to implement the Step (4.1.1) of the Procedure (1) as described above. In response to removing the selected node pair from the candidate set at block 1434, or in response to determining at decision point 1432 that the nodes visited by the other node pairs in the set of candidate node pairs is a proper superset of the nodes visited by the selected node pair, the process 1400 makes a determination at decision point 1436 as to whether the last remaining candidate node pair has been processed. In response to determining that the last remaining candidate node pair has not been processed, the process 1400 returns to decision point 1426 to select a next remaining candidate node pair and iterates as described above.

In response to determining that the last remaining candidate node pair has been processed at decision point 1436, the process 1400 defines the computed scope as the remaining node pairs in the candidate set at block 1438. The process 1400 saves the defined scope to a memory, such as the scope definition storage area 212 within the memory 210, at block 1440. The process 1400 returns to decision point 1402 and iterates as described above.

As such, the process 1400 implements the Procedure (1) described above for scope definition computation to allow computer computation of scope definitions. As described above, the Procedure (1) may be applied to both cyclic and acyclic graphs.

Figure 15:
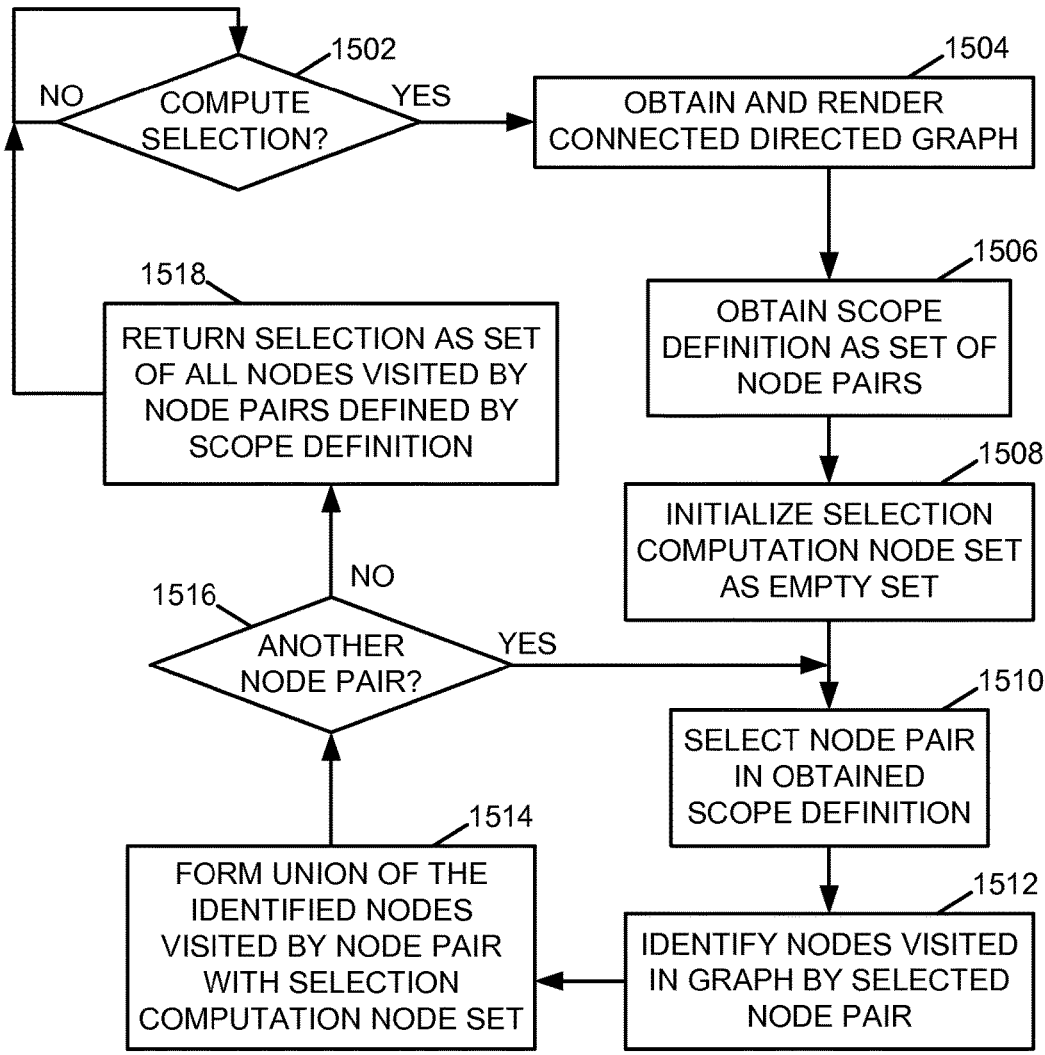
FIG. 15 is a flow chart of an example of an implementation of a process for scope selection computation to compute node selections from scope definitions according to an embodiment of the present subject matter.

FIG. 15 is a flow chart of an example of an implementation of a process 1500 for scope selection computation to compute node selections from scope definitions. The process 1500 represents an example implementation of the Procedure (2) described above that may be implemented by a computing device to perform selection computation processing.

At decision point 1502, the process 1500 makes a determination as to whether a request to compute a selection has been detected. A request to compute a selection may be detected, for example, in response to user input via a graphical user interface (GUI) or other input device, as appropriate for a given implementation.

In response to determining that a request to compute a selection has been detected, the process 1500 obtains and renders a connected directed graph specified in association with the detected request to compute the selection at block 1504. At block 1506, the process 1500 obtains a scope definition as a set of node pairs. The scope definition defined as a set of node pairs may be obtained from the memory as calculated and saved using the process 1400 of FIG. 14 described above.

At block 1508, the process 1500 initializes a selection computation node set (S) as an empty set to implement the Step (1) of the Procedure (2) as described above. At block 1510, the process 1500 selects a node pair (b, e) in the obtained scope definition to begin implementation of the Step (2) of the Procedure (2) as described above. At block 1512, the process 1500 identifies nodes visited in the obtained graph by the selected node pair. At block 1514, the process 1500 forms a union of the identified nodes visited in the obtained graph by the selected node pair with the selection computation node set (S) (initially the empty set, and built over time) to implement the Step (2.1) of the Procedure (2) as described above.

At decision point 1516, the process 1500 makes a determination as to whether another node pair exists in the obtained scope definition. In response to determining that another node pair exists in the obtained scope definition, the process 1500 returns to block 1510 to select the next node pair in the scope definition and iterates as described above. In response to determining that another node pair does not exist in the obtained scope definition, the process 1500 returns the selection computation node set (S) as the set of all nodes visited by the node pairs defined by the obtained scope definition. Returning may include storing or displaying/rendering the resultant selection computation node set (S). The process 1500 returns to decision point 1502 and iterates as described above.

As such, the process 1500 implements the Procedure (2) described above for selection computation to allow computer computation of selections. As described above, the Procedure (2) may be implemented to compute node selections based upon defined scopes that have been defined using the Procedure (1).

Figure 16:
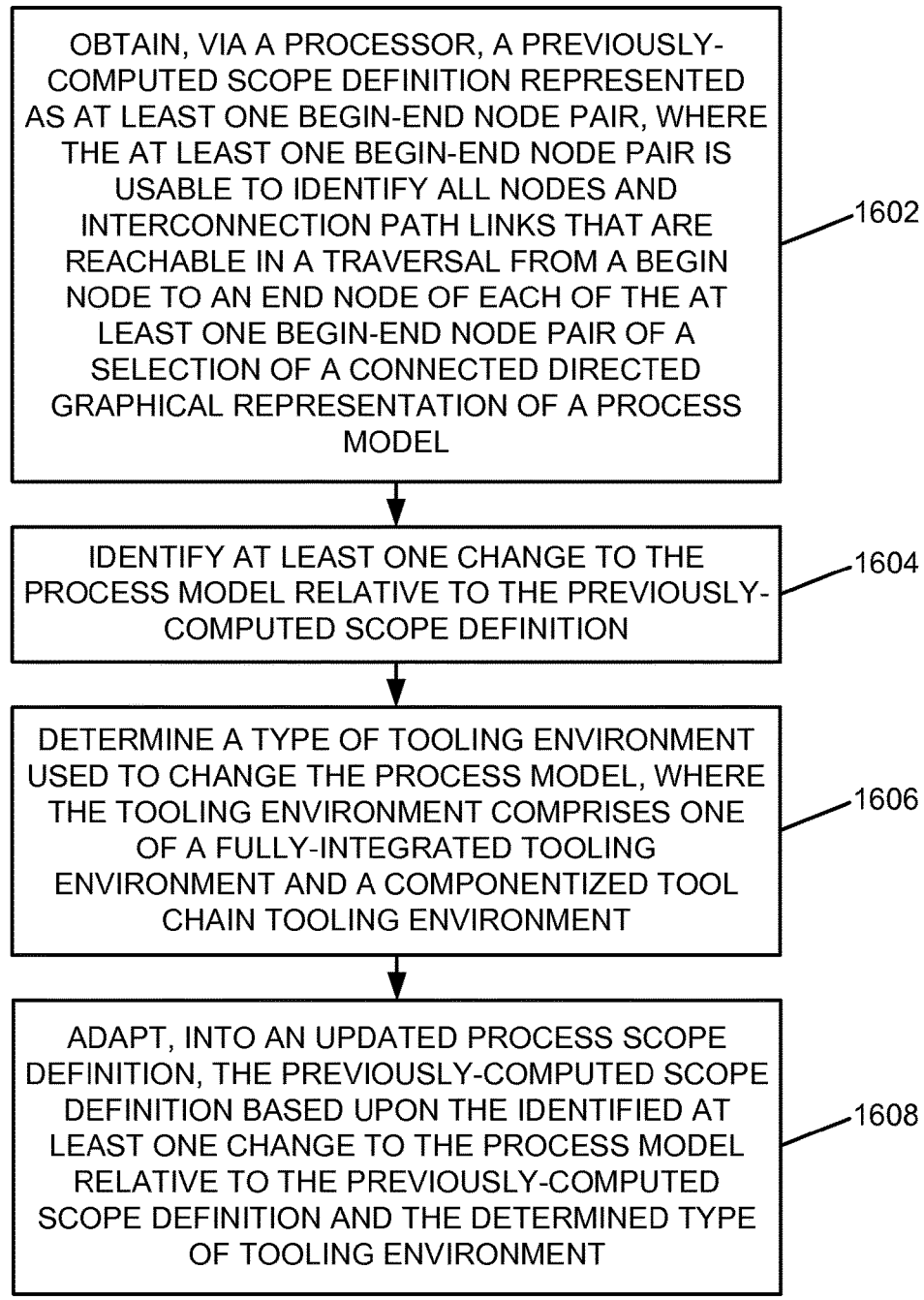
FIG. 16 is a flow chart of an example of an implementation of a process for node-pair process scope definition adaptation according to an embodiment of the present subject matter.

FIG. 16 is a flow chart of an example of an implementation of a process 1600 for node-pair process scope definition adaptation. At block 1602, the process 1600 obtains, via a processor, a previously-computed scope definition represented as at least one begin-end node pair, where the at least one begin-end node pair is usable to identify all nodes and interconnection path links that are reachable in a traversal from a begin node to an end node of each of the at least one begin-end node pair of a selection of a connected directed graphical representation of a process model. At block 1604, the process 1600 identifies at least one change to the process model relative to the previously-computed scope definition. At block 1606, the process 1600 determines a type of tooling environment used to change the process model, where the tooling environment comprises one of a fully-integrated tooling environment and a componentized tool chain tooling environment. At block 1608, the process 1600 adapts, into an updated process scope definition, the previously-computed scope definition based upon the identified at least one change to the process model relative to the previously-computed scope definition and the determined type of tooling environment.

Figure 17:
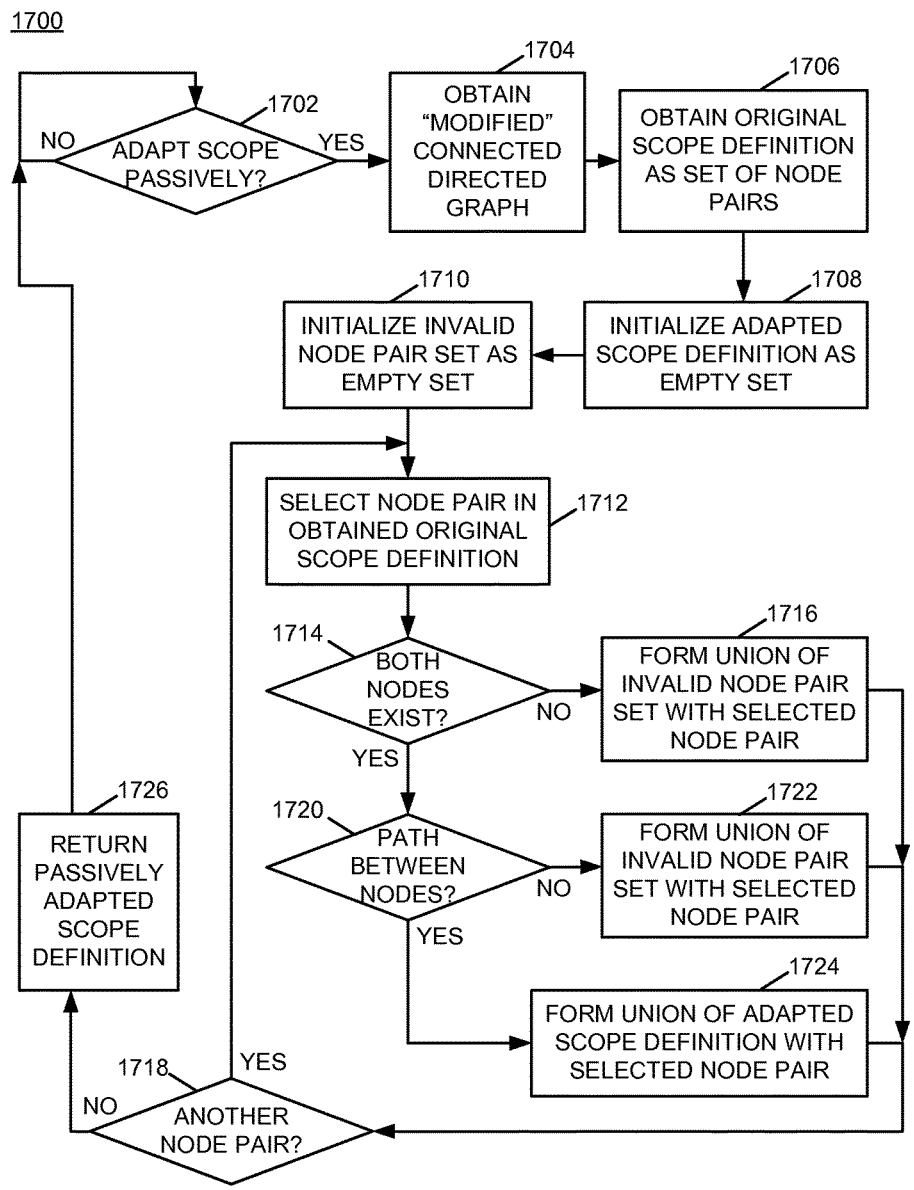
FIG. 17 is a flow chart of an example of an implementation of a process for passive node-pair process scope definition adaptation to passively adapt a scope definition based upon changes to a process performed using a componentized tool chain according to an embodiment of the present subject matter.

FIG. 17 is a flow chart of an example of an implementation of a process 1700 for passive node-pair process scope definition adaptation to passively adapt a scope definition based upon changes to a process performed using a componentized tool chain. The process 1700 represents an example implementation of the Procedure (3) described above that may be implemented by a computing device to perform passive scope adaptation processing. As described above, passive scope adaptation may be utilized within a componentized tool chain tooling environment.

At decision point 1702, the process 1700 makes a determination as to whether a request to passively adapt a previously-computed scope has been detected. A request to passively adapt a previously-computed scope may be detected, for example, in response to user input via a graphical user interface (GUI) or other input device, as appropriate for a given implementation.

In response to determining that a request to passively adapt a previously-computed scope has been detected, the process 1700 obtains a modified connected directed graph specified in association with the detected request to passively adapt a previously-computed scope at block 1704. At block 1706, the process 1700 obtains an original scope definition defined as a set of node pairs. The scope definition defined as a set of node pairs may be obtained from a memory as calculated and saved using the process 1400 of FIG. 14 described above.

At block 1708, the process 1700 initializes an adapted scope definition as an empty set to begin the Step (1) of the Procedure (3) described above. At block 1710, the process 1700 initializes an invalid node pair set as an empty set to complete the Step (1) of the Procedure (3) described above. At block 1712, the process 1700 selects a first node pair in the obtained original scope definition to begin processing of the Step (2) of the Procedure (3) as described above.

At decision point 1714, the process 1700 makes a determination as to whether both nodes exist in the obtained modified connected directed graph to implement the Step (2.1) of the Procedure (3) as described above. In response to determining that either node of the selected node pair does not exist in the modified connected directed graph, the process 1700 forms a union of the invalid node pair set (originally empty) with the selected node pair to remove the selected node pair from the passively adapted scope at block 1716 to implement the Step (2.1.1) of the Procedure (3) as described above. In response to removing the selected node pair from the passively adapted scope at block 1716, the process 1700 makes a determination at decision point 1718 as to whether another node pair exists in the original scope definition. In response to determining that another node pair exists in the original scope definition, the process 1700 returns to block 1712 to select the next node pair and iterates as described above.

Returning to the description of decision point 1714, in response to determining for any given node pair of the original scope definition that both nodes exist in the obtained modified connected directed graph, the process 1700 makes a determination at decision point 1720 as to whether there is a valid path between the nodes in the modified connected directed graph to implement the Step (2.2) of the Procedure (3) as described above. In response to determining that there is not a valid path between the nodes in the modified connected directed graph, the process 1700 forms a union of the invalid node pair set with the selected node pair to remove the selected node pair from the passively adapted scope at block 1722 to implement the Step (2.2.1) of the Procedure (3) as described above. The process returns to decision point 1718 and iterates as described above.

Returning to the description of decision point 1720, in response to determining that there is a valid path between the nodes in the modified connected directed graph, the process 1700 forms a union of the adapted scope definition with the selected node pair to retain the selected node pair within the passively adapted scope at block 1724 to implement the Steps (2.3 and 2.3.1) of the Procedure (3) as described above.

Returning to the description of decision point 1718, in response to determining that all node pairs of the original scope definition have been processed (i.e., that another node pair does not exist in the original scope definition), the process 1700 returns the passively adapted scope definition at block 1726. The process 1700 returns to decision point 1702 and iterates as described above.

As such, the process 1700 implements the Procedure (3) described above for passive scope adaptation to allow passive computer adaptation of scopes. As described above, the Procedure (3) may be implemented to passively adapt scopes based upon defined scopes that have been defined using the Procedure (1).

Figure 18A:
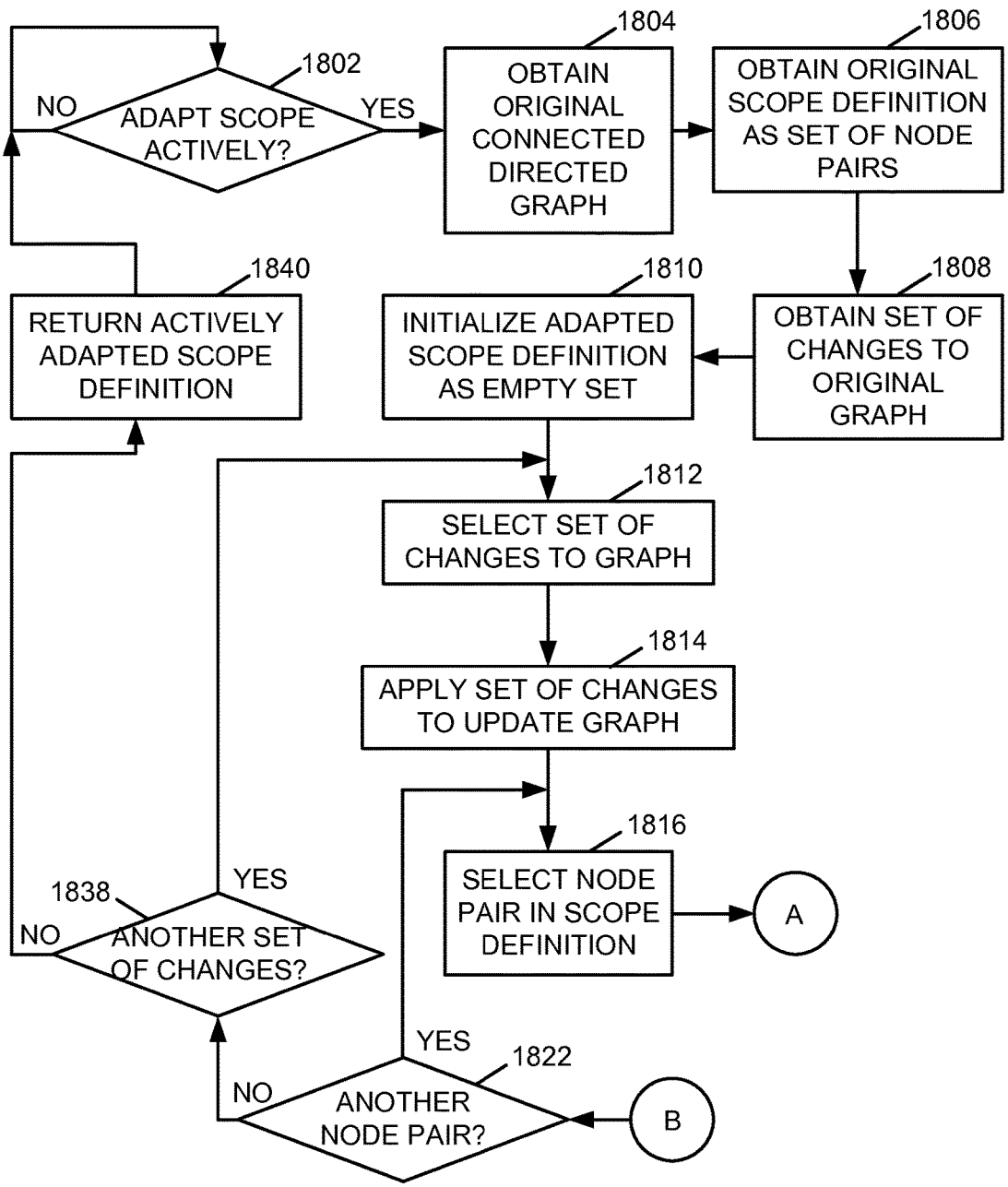
FIG. 18A is a flow chart of an example of an implementation of initial processing within a process for active node-pair process scope definition adaptation to actively adapt a scope definition based upon changes to a process performed within an integrated tooling environment according to an embodiment of the present subject matter.
Figure 18B:
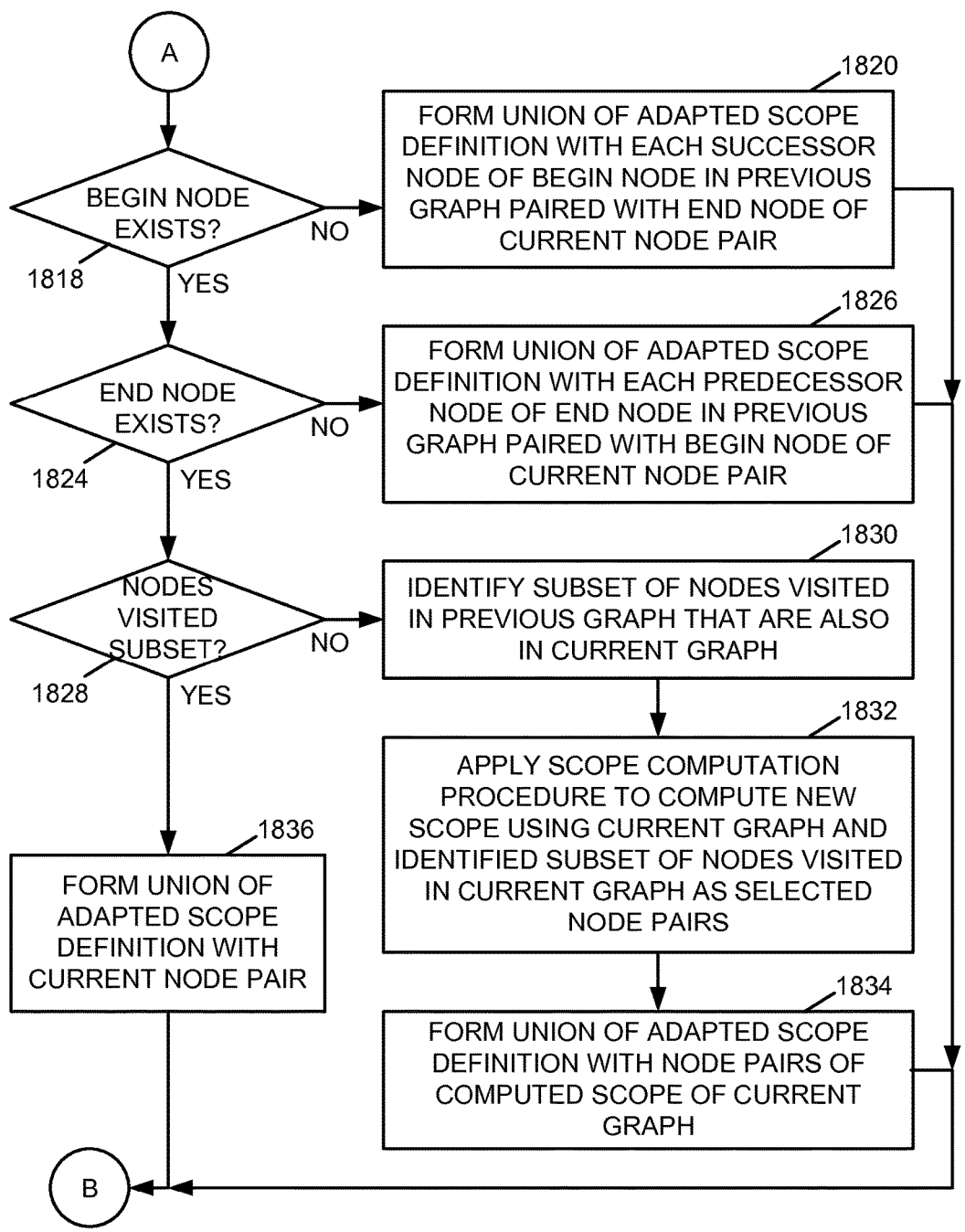
FIG. 18B is a flow chart of an example of an implementation of additional processing within a process for active node-pair process scope definition adaptation to actively adapt a scope definition based upon changes to a process performed within an integrated tooling environment according to an embodiment of the present subject matter.

FIGS. 18A-18B illustrate a flow chart of an example of an implementation of process 1800 for active node-pair process scope definition adaptation to actively adapt a scope definition based upon changes to a process performed within an integrated tooling environment. FIG. 18A illustrates initial processing within the process 1800. The process 1800 represents an example implementation of the Procedure (4) described above that may be implemented by a computing device to perform active scope adaptation processing. As described above, active scope adaptation may be utilized within a fully-integrated tooling environment.

At decision point 1802, the process 1800 makes a determination as to whether a request to actively adapt a previously-computed scope has been detected. A request to actively adapt a previously-computed scope may be detected, for example, in response to user input via a graphical user interface (GUI) or other input device, as appropriate for a given implementation.

In response to determining that a request to actively adapt a previously-computed scope has been detected, the process 1800 obtains the original connected directed graph specified in association with the detected request to actively adapt a previously-computed scope at block 1804. At block 1806, the process 1800 obtains an original scope definition defined as a set of node pairs. The scope definition defined as a set of node pairs may be obtained from a memory as calculated and saved using the process 1400 of FIG. 14 described above.

At block 1808, the process 1800 obtains a set of changes to the original graph, which may be represented as a sequence of graphs that represent each "modification" of the "original" graph (G). At block 1810, the process 1800 initializes an adapted scope definition as an empty set to begin the Step (1) of the Procedure (4) described above.

At block 1812, the process 1800 selects the first set of changes to the original graph to begin the Step (2) of the Procedure (4) as described above. It should be noted that the process 1800 applies iterative processing to each set of changes, as described above and in more detail below. At block 1814, the process 1800 applies the selected set of changes to update the graph.

At block 1816, the process 1800 selects a first node pair in the obtained original scope definition to begin processing of the Step (2) of the Procedure (4) as described above. The process 1800 transitions to the processing shown and described in association with FIG. 18B.

FIG. 18B illustrates additional processing associated with the process 1800 for active node-pair process scope definition adaptation to actively adapt a scope definition based upon changes to a process performed within an integrated tooling environment. At decision point 1818, the process 1800 makes a determination as to whether the begin node of the selected node pair exists in the modified graph to implement the Step (2.1) of the Procedure (4) as described above. In response to determining that the begin node of the selected node pair does not exist in the modified graph, at block 1820 the process 1800 forms a union of the adapted scope definition (initially empty) with each successor node of the begin node in the previous graph (initially the original graph, then the previous modified graph for subsequent iterations) paired with the end node of the current node pair to implement the Steps (2.1.1 and 2.1.1.1) of the Procedure (4) as described above. The process 1800 returns to FIG. 18A and makes a determination at decision point 1822 as to whether another node pair exists to process in the original scope definition for the current iteration/modification to the connected directed graph. In response to determining at decision point 1822 that another node pair exists to process in the original scope definition for the current iteration/modification to the connected directed graph, the process 1800 returns to block 1816 to select the next node pair in the scope definition and iterates as described above by transitioning to the processing described in association with FIG. 18B.

Returning to FIG. 18B and the description of decision point 1818, in response to determining that the begin node of the selected node pair does exist in the modified graph, the process 1800 makes a determination at decision point 1824 as to whether the end node of the selected node pair exists in the modified graph to implement the Step (2.2) of the Procedure (4) as described above. In response to determining that the end node of the selected node pair does not exist in the modified graph, at block 1826 the process 1800 forms a union of the adapted scope definition with each predecessor node of the end node in the previous graph (initially the original graph, then the previous modified graph for subsequent iterations) paired with the begin node of the current node pair to implement the Steps (2.2.1 and 2.2.1.1) of the Procedure (4) as described above. The process 1800 returns to FIG. 18A and makes a determination at decision point 1822 as to whether another node pair exists to process in the original scope definition for the current iteration/modification to the connected directed graph. In response to determining at decision point 1822 that another node pair exists to process in the original scope definition for the current iteration/modification to the connected directed graph, the process 1800 returns to block 1816 to select the next node pair in the scope definition and iterates as described above by transitioning to the processing described in association with FIG. 18B.

Returning to FIG. 18B and the description of decision point 1824, in response to determining that the end node of the selected node pair exists in the modified graph, the process 1800 makes a determination at decision point 1828 as to whether nodes visited by the current node pair in the previous graph is a subset of the nodes in the current graph to implement the Step (2.3) of the Procedure (4) as described above. In response to determining that nodes visited by the current node pair in the previous graph is not a subset of the nodes in the current graph, the process 1800 identifies at block 1830 a subset of nodes visited in the previous graph that are also in the current graph to implement the Step (2.3.1) of the Procedure (4) as described above.

At block 1832, the process 1800 applies the scope computation procedure (Procedure (1) as described in the process 1400 of FIG. 14) to compute a new scope definition using the current graph and the identified subset of nodes visited in the current graph as selected node pairs to implement the Step (2.3.2) of the Procedure (4) as described above. At block 1834, the process 1800 forms a union of the adapted scope definition with node pairs of the computed scope of the current graph to implement the Step (2.3.3) of the Procedure (4) as described above. The process 1800 returns to FIG. 18A and makes a determination at decision point 1822 as to whether another node pair exists to process in the original scope definition for the current iteration/ modification to the connected directed graph. In response to determining at decision point 1822 that another node pair exists to process in the original scope definition for the current iteration/modification to the connected directed graph, the process 1800 returns to block 1816 to select the next node pair in the scope definition and iterates as described above by transitioning to the processing described in association with FIG. 18B.

Returning to FIG. 18B and the description of decision point 1828, in response to determining that nodes visited by the current node pair in the previous graph is a subset of the nodes in the current graph, the process 1800 forms a union of the adapted scope definition with the current node pair at block 1836 to implement the Step (2.4) of the Procedure (4) as described above. The process 1800 returns to FIG. 18A and makes a determination at decision point 1822 as to whether another node pair exists to process in the original scope definition for the current iteration/modification to the connected directed graph.

Returning to the description of FIG. 18A and decision point 1822, in response to determining that another node pair does not exist to process in the original scope definition for the current iteration/modification to the connected directed graph, the process 1800 makes a determination at decision point 1838 as to whether another set of changes to the graph exists to process to further actively adapt the scope definition. In response to determining at decision point 1838 that another set of changes to the graph exists to process to further actively adapt the scope definition, the process 1800 returns to block 1812 to select the next set of changes to the graph and iterates as described above.

In response to determining at decision point 1838 that another set of changes to the graph does not exist to process and that active adaptation of the scope definition is completed, the process 1800 returns the actively adapted scope definition at block 1840. The process 1800 returns to decision point 1802 and iterates as described above.

As such, the process 1800 implements the Procedure (4) described above for active scope adaptation to allow active computer adaptation of scopes. As described above, the Procedure (4) may be implemented to actively adapt scopes based upon defined scopes that have been defined using the Procedure (1), and may define new scopes using the Procedure (1) at each iteration as appropriate and as described above.

As described above in association with FIG. 1 through FIG. 18B, the example systems and processes provide node-pair process scope definition and scope selection computation, and node-pair process scope definition adaptation. Many other variations and additional activities associated with node-pair process scope definition and scope selection computation, and node-pair process scope definition adaptation are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product, comprising:
  a non-transitory computer readable storage medium having computer readable program code embodied therewith, where the computer readable program code when executed on a computer causes the computer to:
    display a connected directed graphical representation of a process model that comprises a plurality of process nodes and interconnections between the process nodes of the process model;
    receive a user selection of a subset of the process nodes of the displayed connected directed graphical representation of the process model;
    compute a process scope definition represented as at least one begin-end node pair, where the at least one begin-end node pair is usable to identify all selected nodes and interconnection path links that are reachable in a traversal from a begin node to an end node of each of the at least one begin-end node pair of the received user selection of the subset of the process nodes; and
    where, in causing the computer to compute the process scope definition, the computer readable program code when executed on the computer causes the computer to:
      compute an induced subgraph of the connected directed graphical representation of the process model that includes the user selected subset of the process nodes of the displayed connected directed graphical representation of the process model;
      initialize a set of candidate node pairs as all combinations of node pairs in the induced subgraph;
      iteratively apply a two stage candidate node pair removal process that removes candidate node pairs that violate scope definition constraints from the set of candidate node pairs; and define the process scope definition as begin-end node pairs within the set of candidate node pairs that remain after the iterative application of the two stage candidate node pair removal process; and where, in causing the computer to iteratively apply the two stage candidate node pair removal process that removes the candidate node pairs that violate the scope definition constraints from the set of candidate node pairs, the computer readable program code when executed on the computer causes the computer to:

at a first stage of the two stage candidate node pair removal process, for each candidate node pair:
remove the candidate node pair from the set of candidate node pairs if no valid path exists in the user selected subset of the process nodes between a begin node and an end node of the candidate node pair; and
remove the candidate node pair from the set of candidate node pairs if any node in a valid path from the begin node to the end node connects to any node that is not in the user selected subset of the process nodes; and at a second stage of the two stage candidate node pair removal process, for each candidate node pair:
remove candidate node pairs identified as redundant candidate node pairs that comprise a set of nodes visited that is a subset of a set of nodes visited by any other candidate node pair; and where the computer readable program code when executed on the computer further causes the computer to:
store the computed process scope definition;
receive a user-specified command to be applied to nodes of a process scope enclosed by the computed process scope definition within the process model; and
apply the user-specified command to the nodes of the process scope enclosed by the computed process scope definition within the process model.

2. The computer program product of claim 1, where the computer program product is in the form of a computer system, with the computer program product further comprising:
a processor(s) set structured, programmed, and/or connected to execute the computer readable program code stored in the non-transitory computer readable storage medium.

3. A computer program product, comprising:
a non-transitory computer readable storage medium having computer readable program code embodied therewith, where the computer readable program code when executed on a computer causes the computer to:
display a connected directed graphical representation of a process model that comprises a plurality of process nodes and interconnections between the process nodes of the process model;
receive a user selection of a subset of the process nodes of the displayed connected directed graphical representation of the process model;
compute a process scope definition represented as at least one begin-end node pair, where the at least one begin-end node pair is usable to identify all selected nodes and interconnection path links that are reachable in a traversal from a begin node to an end node of each of the at least one begin-end node pair of the received user selection of the subset of the process nodes; and where, in causing the computer to compute the process scope definition, the computer readable program code when executed on the computer causes the computer to:
compute an induced subgraph of the connected directed graphical representation of the process model that includes the user selected subset of the process nodes of the displayed connected directed graphical representation of the process model;
initialize a set of candidate node pairs as all combinations of node pairs in the induced subgraph;
iteratively apply a two stage candidate node pair removal process that removes candidate node pairs that violate scope definition constraints from the set of candidate node pairs; and
define the process scope definition as begin-end node pairs within the set of candidate node pairs that remain after the iterative application of the two stage candidate node pair removal process; and where, in causing the computer to iteratively apply the two stage candidate node pair removal process that removes the candidate node pairs that violate the scope definition constraints from the set of candidate node pairs, the computer readable program code when executed on the computer causes the computer to:
at a first stage of the two stage candidate node pair removal process, for each candidate node pair:
determine whether a defined valid path exists between the respective pair of nodes;
remove each candidate node pair from the set of candidate node pairs in response to determining that no valid path exists between the respective pair of nodes;
determine whether nodes visited by the respective pair of nodes is a superset of the user selected subset of the process nodes; and
remove each candidate node pair from the set of candidate node pairs in response to determining that the nodes visited by the respective pair of nodes is the superset of the user selected subset of the process nodes; and at a second stage of the two stage candidate node pair removal process, for each candidate node pair that remains after application of the first stage of the two stage candidate node pair removal process:
determine, for each other node pair in the user selected subset of the process nodes, whether nodes visited by the other node pair are within the user selected subset of the process nodes;
determine, for any other node pair with nodes visited by the other node pair that are within the user selected subset of the process nodes, whether the nodes visited by the other node pair form a superset of nodes visited by the candidate node pair; and
remove each candidate node pair from the set of candidate node pairs for which nodes visited by the other node pair form the superset of nodes visited by the candidate node pair; and where the computer readable program code when executed on the computer further causes the computer to:

store the computed process scope definition;
receive a user-specified command to be applied to nodes of a process scope enclosed by the computed process scope definition within the process model; and
apply the user-specified command to the nodes of the process scope enclosed by the computed process scope definition within the process model.

4. The computer program product of claim 3, where the computer program product is in the form of a computer system, with the computer program product further comprising:
a processor(s) set structured, programmed, and/or connected to execute the computer readable program code stored in the non-transitory computer readable storage medium.

5. A computer program product, comprising:
a non-transitory computer readable storage medium having computer readable program code embodied therewith, where the computer readable program code when executed on a computer causes the computer to:
display a connected directed graphical representation of a process model that comprises a plurality of process nodes and interconnections between the process nodes of the process model;
receive a user selection of a subset of the process nodes of the displayed connected directed graphical representation of the process model;
compute a process scope definition represented as at least one begin-end node pair, where the at least one begin-end node pair is usable to identify all selected nodes and interconnection path links that are reachable in a traversal from a begin node to an end node of each of the at least one begin-end node pair of the received user selection of the subset of the process nodes;
store the computed process scope definition;
detect a user interface request to compute a selection of nodes of a process scope enclosed by the computed process scope definition within the process model;
retrieve the stored computed process scope definition that comprises the at least one begin-end node pair;
retrieve the connected directed graphical representation of the process model that comprises the plurality of process nodes and interconnections between the process nodes of the process model;
form, by iteratively processing the at least one begin-end node pair of the retrieved computed process scope definition, a non-duplicative union of a set of nodes comprising all subsets of nodes visited by the respective begin-end node pairs of the retrieved computed process scope definition; and
output the computed selection of nodes as the formed non-duplicative union of the set of nodes of the connected directed graphical representation of the process model;
where, in causing the computer to form, by iteratively processing the at least one begin-end node pair of the retrieved computed process scope definition, the non-duplicative union of the set of nodes, the computer readable program code when executed on the computer causes the computer to:
initialize the set of nodes as an empty set; and
for each iteration:
identify all nodes visited by the respective begin-end node pair in all valid paths between a begin node and an end node of the begin-end node pair of the retrieved computed process scope definition; and
form a union of the set of nodes with all identified nodes visited by the respective begin-end node pair;
where the computer readable program code when executed on the computer further causes the computer to:
receive a user-specified command to be applied to the computed selection of nodes of the process scope enclosed by the computed process scope definition within the process model; and
apply the user-specified command to the computed selection of nodes of the process scope enclosed by the computed process scope definition within the process model.

6. The computer program product of claim 5, where the computer program product is in the form of a computer system, with the computer program product further comprising:
a processor(s) set structured, programmed, and/or connected to execute the computer readable program code stored in the non-transitory computer readable storage medium.

* * * * *